United States Patent
Toguchi

(10) Patent No.: US 6,408,355 B1
(45) Date of Patent: *Jun. 18, 2002

(54) METHOD FOR RELEASING ISOCHRONOUS TRANSACTION IN BUS NETWORK, BUS NETWORK UTILIZING THE METHOD THEREOF AND INFORMATION PROVISION MEDIUM

(75) Inventor: Kazunobu Toguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,460

(22) Filed: Jul. 12, 1999

(30) Foreign Application Priority Data

Jul. 14, 1998 (JP) .......................................... 10-199069

(51) Int. Cl.⁷ .......................... G06F 13/14; G06F 13/40
(52) U.S. Cl. ...................................................... 710/314
(58) Field of Search .................................. 710/305–315

(56) References Cited

U.S. PATENT DOCUMENTS 6,032,261 A * 2/2000 Hulyalkar .................... 713/400
6,119,243 A * 9/2000 Garney et al. ............... 713/600
6,279,058 B1 * 8/2001 Gulick ......................... 710/58
2001/0007118 A1 * 7/2001 Matsuda ...................... 710/129

* cited by examiner

Primary Examiner—Sumati Lefkowitz
(74) Attorney, Agent, or Firm—Jay H. Maioli

(57) ABSTRACT

The invention relates to A method for releasing the setting of isochronous transaction in a bus network, such as an IEEE-1394 bus network, in which plural buses are connected via a bridge, a bus network utilizing the method and a medium of an information provider, wherein an owner (a resource-possessing node), a talker (a sending node) and a listener (a receiving node) are connected to any of plural buses constituting an IEEE-1394 bus network. In a first step, a command to set synchronous communication is propagated from the owner to a portal of a bridge. A release from the setting of isochronous transaction is executed from the owner to a portal of a bridge. In a second step, a command to set communication between portals of bridges on the same bus is propagated. A release from the setting between portals of bridges on the same bus is executed. In a third step, a command to set communication is propagated between portals of the same bridge. A release from the setting between portals of the same bridge is executed, and the first step is executed, the second and third steps are suitably repeated. Therefore, a command for releasing the setting of isochronous transaction is sequentially propagated and the setting of isochronous transaction for the buses and the bridges on a path from the talker to the listener is released.

9 Claims, 15 Drawing Sheets

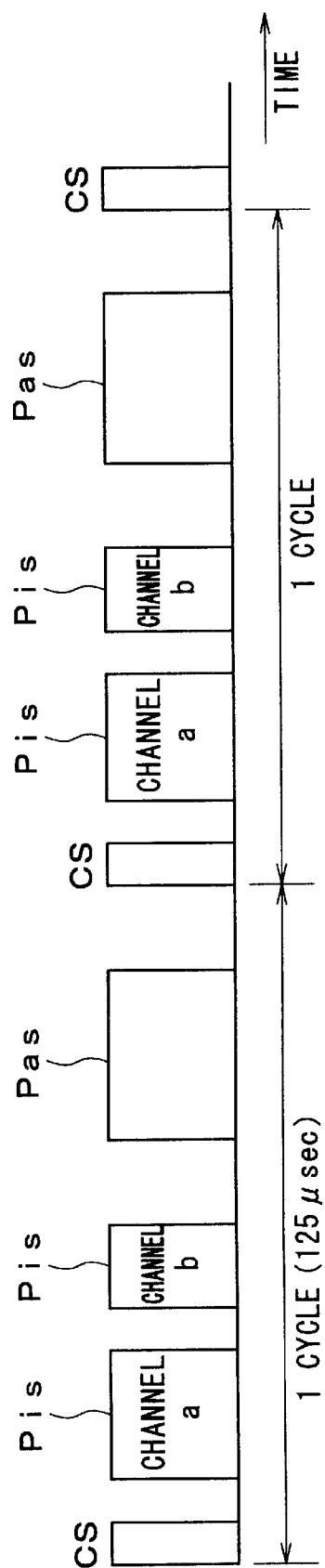

F I G. 8

| OFFSET | NAME | FUNCTION |
|---|---|---|
| 000h | STATE_CLEAR | STATE AND CONTROL INFORMATION |
| 004h | STATE_SET | SETTING STATE_CLEAR BIT |
| 008h | NODE_IDs | INDICATING 16-BIT NODE ID |
| 00Ch | RESET_START | STARTING COMMAND RESET |
| 018h-01Ch | SPLIT_TIMEOUT | PRESCRIBING MAXIMUM TIME OF SPLITS |
| 200h | CYCLE_TIME | CYCLE TIME |
| 210h | BUSY_TIMEOUT | PRESCRIBING LIMITATION ON RETRY |
| 21Ch | BUS_MANAGER | INDICATING ID OF BUS MANAGER |
| 220h | BANDWIDTH_AVAILABLE | INDICATING BAND ASSIGNABLE TO ISOCHRONOUS COMMUNICATION |
| 224h-228h | CHANNELS_AVAILABLE | INDICATING STATE OF USE OF EACH CHANNEL |

US 6,408,355 B1

METHOD FOR RELEASING ISOCHRONOUS TRANSACTION IN BUS NETWORK, BUS NETWORK UTILIZING THE METHOD THEREOF AND INFORMATION PROVISION MEDIUM

BACKGROUND OF THE INVENTION

1. Field of the Invention

The present invention generally relates to a method for releasing isochronous transaction in a bus network such as an IEEE-1394 bus network in which plural buses are connected via a bridge, a bus network utilizing the method and a medium of an information provider. More particularly, the present invention relates to a method for releasing isochronous transaction in a bus network and others wherein, when the setting of isochronous transaction for a bus and a bridge respectively constituting a path (a communication channel) from a sending node to a receiving node is released, a request for releasing the setting of isochronous transaction from a resource-possessing node is sequentially propagated to enable the setting of isochronous transaction to be released satisfactorily, even if the resource-possessing node, the sending node and the receiving node do not exist on the same bus.

2. Description of Relevant Art

For a standard for transmitting a digital signal, multiple standards such as standards by International Electrotechnical Commission (IEC) and Institute of Electrical and Electronics Engineers (IEEE) exist. Above all, IEEE 1394 attracts attention in application to multimedia such as the connection between pieces of the electronic equipment for domestic use, for example, digital video recorder, and connection between these pieces of the electronic equipment and a computer. As IEEE 1394 is well-known, the description of the contents is omitted.

Currently, P1394.1 working group makes the protocol standardization activities of a bridge for connecting buses used in an IEEE-1394 high-speed serial bus communication environment (the working group has prepared a draft for standardization entitled P1394.1 Draft 0.03 Oct. 18, 1997 as of June in 1998). In the following description, the above latest draft for standardization is called a bridge draft. An IEEE-1394 bridge (hereinafter called only a bridge) is composed of two communication means connected thereto, each of which is called a portal, and is connected to an IEEE-1394 bus (hereinafter suitably abbreviated to a bus). The data can be transmitted via the above bridge between plural buses.

The number of nodes (IEEE-1394 equipment) which can be connected to one IEEE-1394 bus is limited to a maximum of 63. However, the connection of the plural buses through the bridge to constitute a bus network including buses and bridges allows it to connect the nodes of more than 63. It has been already proposed that data should be transmitted not only via a cable but using a radio wave, infrared rays and others in a bridge (between portals).

IEEE 1394 is provided with an isochronous transfer function and thus isochronous transaction is executed on an IEEE-1394 bus every 125 μsec.

FIG. 1 shows an example in which an isochronous packet is transferred in isochronous transaction. A node called a cycle master sends a cycle start packet CS every 125 μsec. After the cycle start packet CS is sent, the transfer of an isochronous packet is started. In FIG. 1, two types of isochronous packets Pis are transferred using channels a and b. After the transfer of the isochronous packets Pis is completed, the transfer of an asynchronous packet Pas is started.

To enable the isochronous transaction, the setting of isochronous transaction, that is, the setting for channels and bandwidth is required. However, in IEEE 1394, only a method of setting isochronous transaction in a case that an owner (a resource-possessing node in isochronous transaction), a talker (a packet sending node in isochronous transaction) and a listener (a packet receiving node in isochronous transaction) are connected to the same bus, is defined. That is, a method of setting isochronous transaction in case an owner, a talker and a listener exist on different buses is undefined in the IEEE-1394. Further, a method for releasing the isochronous transaction therebetween is undefined in the IEEE-1394.

The object of the present invention is to provide a method for releasing the isochronous transaction and others in a bus network so that the releasing of isochronous transaction is satisfactorily enabled even if a resource possessing node, a sending node and a receiving node are not connected to the same bus.

SUMMARY OF THE INVENTION

A method according to the present invention is the one for releasing isochronous transaction in a bus network in which a plurality of the buses are connected to each other using a bridge including first and second communication means and is provided with the following first to third steps.

In the first step, a resource-possessing node releases the setting of isochronous transaction for a first bus when a sending node or a receiving node exists on the first bus on which the resource-possessing node itself exists, and the resource-possessing node sends a request for releasing the setting of isochronous transaction to the first communication means of the bridge existing on the first bus when no sending node or no receiving node exists on the first bus. The first communication means of the bridge passes a packet to the sending node or the receiving node respectively not existing on the first bus.

In the second step, the first communication means of the bridge received the request for releasing the setting of isochronous transaction from the resource-possessing node sends a request for releasing the setting of isochronous transaction to the second communication means connected to the first communication means, and releases the setting of isochronous transaction for the first communication means itself when the first communication means itself is existed on a path from the sending node to the receiving node.

In the third step, the second communication means of the bridge received the request for releasing the setting of isochronous transaction releases the setting of isochronous transaction for a second bus when the above sending node or the above receiving node exists on the second bus on which the second communication means itself exists, release the setting of isochronous transaction for the second communication means itself when the second communication means itself exists on a path from the sending node to the receiving node and further sends a request for releasing the setting of isochronous transaction to the first communication means of the bridge existing on the second bus when no sending node or no receiving node exists on the second bus. The first communication means of the bridge passes a packet to the sending node or the receiving node respectively not existing on the above second bus.

In the present invention, after the first step is executed, the second and third steps are suitably repeated. A request for releasing the setting of isochronous transaction is sequentially propagated. Thus, the setting of isochronous transaction for buses and a bridge constituting a path from a sending node to a receiving node is released. Whereby, even if a resource-possessing node, a sending node and a receiving node do not exist on the same bus, the setting of isochronous transaction is satisfactorily released.

A further understanding of the nature and advantages of the invention may be realized by reference to the following portion of the specification and drawings.

BRIEF DESCRIPTION OF THE DRAWINGS

FIG. 1 is a diagram for explaining the transfer of an isochronous packet;

FIG. 8 is a block diagram illustrating the positions and operations of principle CRS, BANDWIDTH_AVAILABLE register and CHANNEL_AVAILABLE register;

DETAILED DESCRIPTION OF PREFERRED EMBODIMENTS

Figures 2A, 2B, 2C:
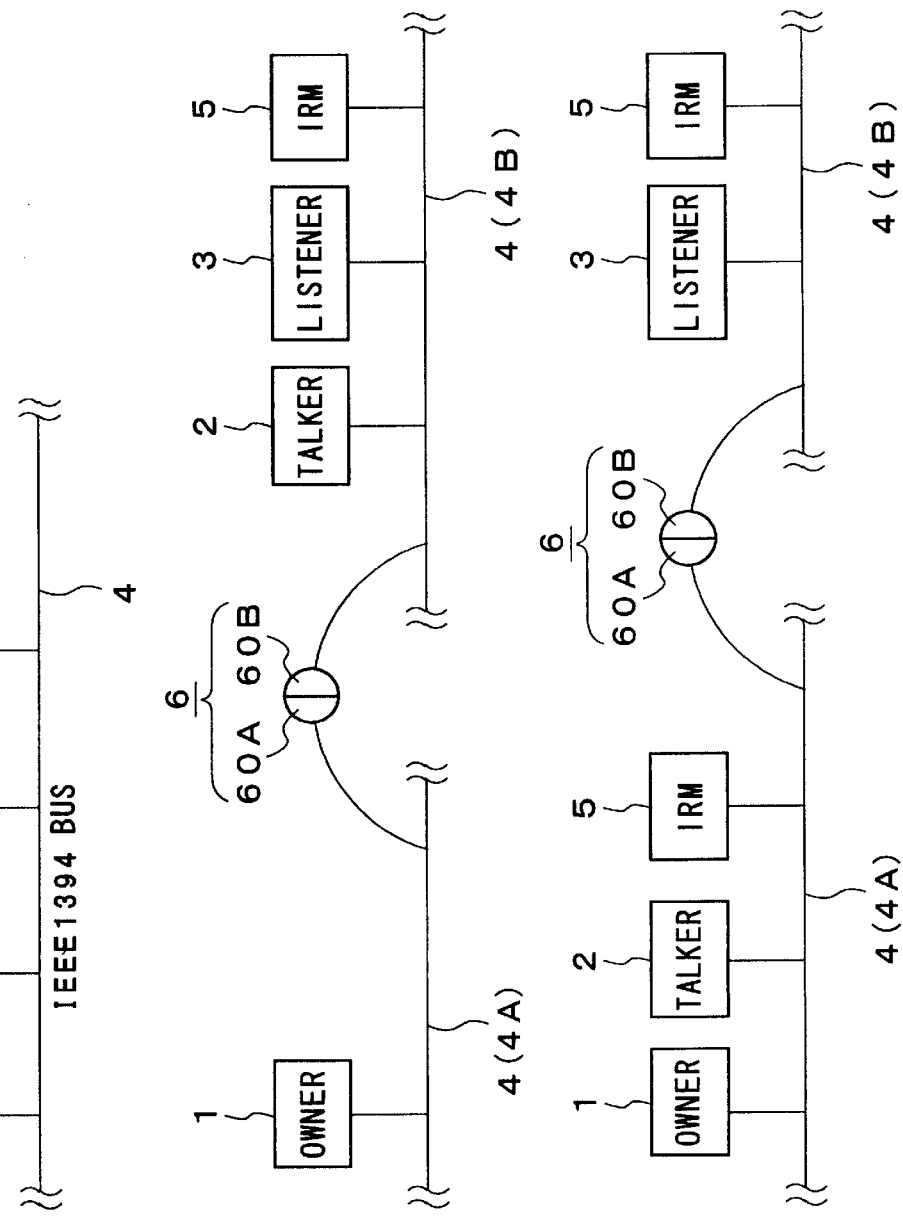
FIGS. 2A through 2C are diagrams each showing an example in which an owner, a talker and a listener are arranged in an IEEE-1394 bus network.

Referring to the drawings, embodiments of the present invention will be described below. Before the concrete description of the contents, main words used in the description will be described briefly to facilitate understanding thereof.

A word, "owner", means a node that possesses a resource of isochronous transaction. The owner starts setting for synchronous communication.

A word, "talker", means a packet-sending node of isochronous transaction and a word, "listener", means a packet-receiving node of isochronous transaction.

For example, a system wherein a personal computer acts as the owner, a video camera acts as the talker and a television receiver acts as the listener is conceivable. Further, a system wherein a video camera acts as the owner and the talker and a television receiver acts as the listener is also conceivable.

Words, "bus ID", mean an identifier for identifying each bus constituting a bus network. Unique bus ID is allocated to each IEEE-1394 bus constituting the bus network.

Words, "local bus ID", mean an identifier for identifying a bus (a local bus) on which a node for executing processing exists.

Words, "talker bus ID", mean an identifier for identifying a bus (a talker bus) on which a talker exists.

Words, "listener bus ID", mean an identifier for identifying a bus (a listener bus) on which a listener exists.

Words, "physical ID", mean a physical identifier for identifying a node connected to a bus. Unique physical ID is allocated to each node connected to the bus.

Words, "talker physical ID", mean the physical ID of a talker.

Words, "listener physical ID", mean the physical ID of a listener.

Words, "node ID", mean an identifier for identifying a node. The node ID is composed of the bus ID and the physical ID. Hereby, Unique node ID is allocated to each node connected to the bus network.

Words, "on the isochronous path (OIP)", mean a flag for showing whether a node exists on a path from a talker to a listener or not. When OIP is 1, the flag shows that the node exists on the path. When OIP is 0, the flag shows that the node does not exist on the path.

Words, "target on the isochronous path (TOIP)", mean a flag for showing whether a target node exists on a path from a talker to a listener or not. When TOIP is 1, the flag shows that the target node exists on the path. When TOIP is 0, the flag shows that the target node does not exist on the path.

A word, "initiator", means a node for sending a set command of isochronous transaction to a target node on the same bus. An owner of isochronous transaction or a portal of a bridge can be the initiator.

Words, "target node", mean a portal of the bridge on a path towards a local bus on which a talker exists, viewed from the initiator, when TOIP is 0 and mean a portal of the bridge on a path towards a local bus on which a listener exists, viewed from the initiator, when TOIP is 1. The initiator and the target node exist on the same bus.

Words, "target node ID", mean a node ID of a target node.

Words, "local bus isochronous transaction", mean isochronous transaction closed in a bus. They are defined in IEEE 1394. The connection of the adjacent local buses allows isochronous transaction via a bridge.

Words, "complete response", mean a response indicating that setting for isochronous transaction is completed.

Words, "fail response", mean a response indicating that setting for isochronous transaction fails.

Words, "other portal", mean the other portal of two portals constituting a bridge, viewed from one portal.

FIGS. 2A to 2C, 3A, 3B, 4A and 4B respectively show an example in which an owner 1, a talker 2 and a listener 3 are arranged in an IEEE-1394 bus network to which the present invention is applied. In FIG. 2A, the owner 1, the talker 2 and the listener 3 exist on the same bus 4.

Words, "isochronous resource manager (IRM)" 5, mean a isochronous transaction control node for controlling communication resources. To enable isochronous transaction, IRM 5 is required on the bus 4 in addition to the owner 1, the talker 2 and the listener 3. The above IRM 5 is automatically selected in bus configuration.

In FIG. 2B, the talker 2 and the listener 3 exist on the same bus 4 and the owner 1 exists on a bus 4 different from the above bus. The buses 4A, 4B are connected via a bridge 6. As shown in FIG. 2B, the bus 4 on which the owner 1 exists and the bus 4 on which the talker 2 and the listener 3 exists are adjacent. However, a case that other one or plural buses 4 exist between the above buses 4A, 4B is conceivable. As for adjacent buses 4A, 4B in FIGS. 2C, 3A, 3B, 4A and 4B, the situation is also the same.

In FIG. 2C, the owner 1 and the talker 2 exist on the same bus 4 and the listener 3 exists on a bus 4 different from the above bus.

Figures 3A, 3B:
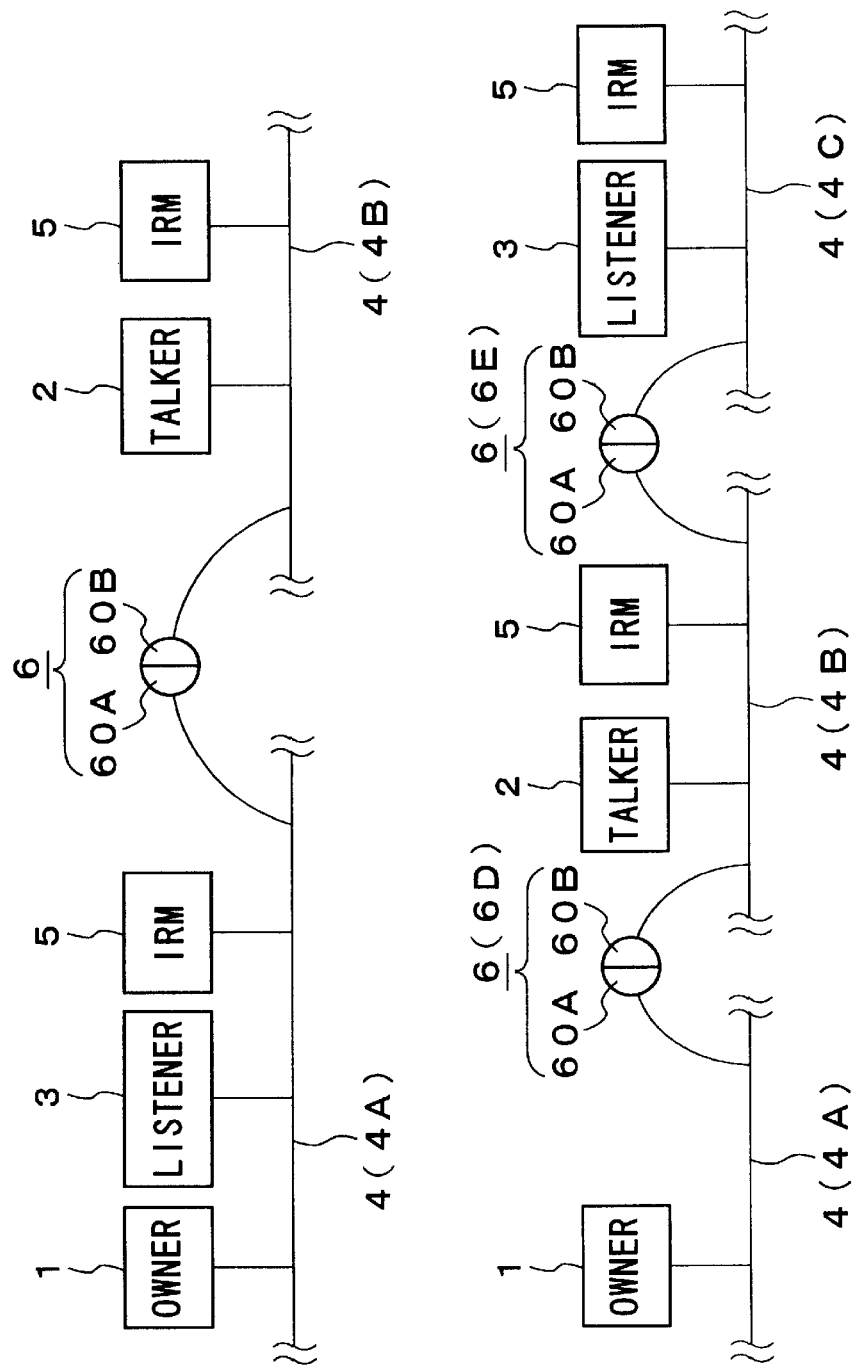
FIGS. 3A and 3B are diagrams each showing another example in which the owner, the talker and the listener are arranged in the IEEE-1394 bus network.

In FIG. 3A, the owner 1 and the listener 3 exist on the same bus 4 and the talker 2 exists on a bus 4 different from the above bus. In FIG. 3B, the owner 1, the talker 2 and the listener 3 exist on each different bus 4 in the above order. The buses 4A, 4B, 4C are sequentially connected via each bridge 6.

Figure 4A:
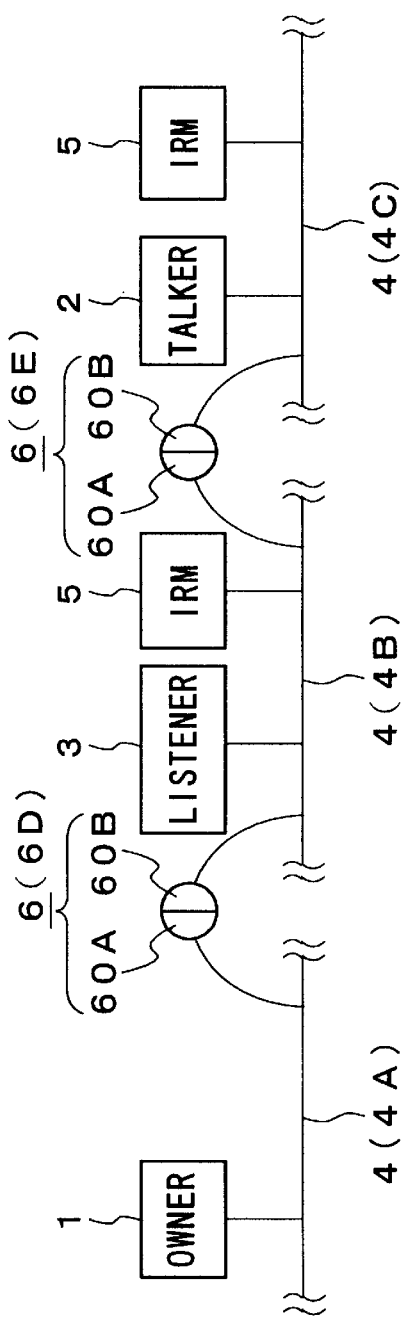
FIGS. 4A and 4B are diagrams each showing further example in which the owner, the talker and the listener are arranged in the IEEE-1394 bus network.
Figure 4B:
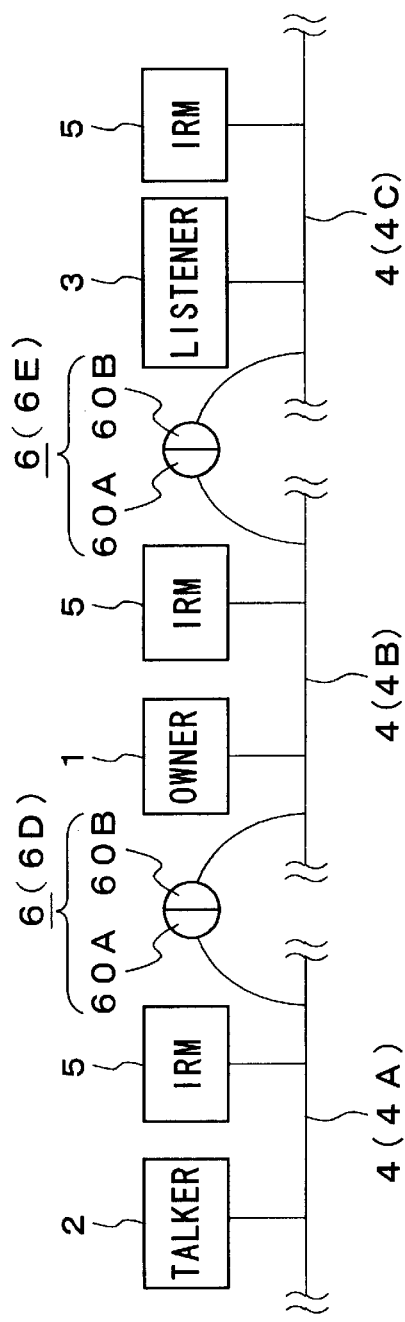

In FIG. 4A, the owner 1, the listener 3 and the talker 2 exist on each different bus 4 in the above order. In FIG. 4B, the talker 2, the owner 1 and the listener 3 exist on each different bus 4 in the above order.

Figure 5:
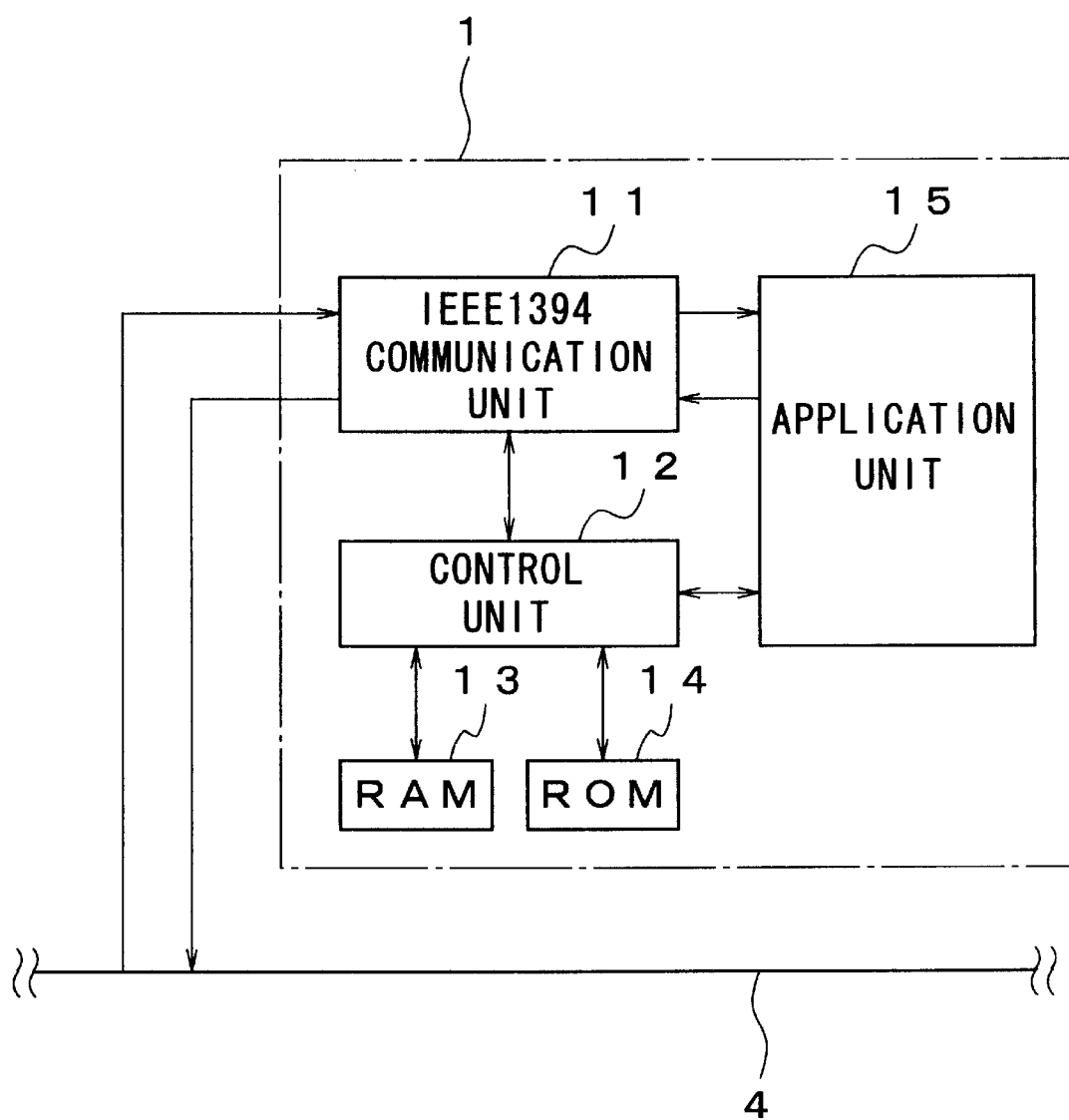
FIG. 5 is a block diagram showing the configuration of the owner.

FIG. 5 shows the configuration of the owner 1. The owner 1 is a node of an IEEE-1394 bus and is composed of an IEEE-1394 communication unit 11, a control unit 12, RAM 13, ROM 14 and an application unit 15.

The control unit 12 or the application unit 15 controls the IEEE-1394 communication unit 11 wherein data supplied from the control unit 12 or the application unit 15 is packed. The IEEE-1394 communication unit 11 sends the IEEE-1394 packet via the bus 4, extracts the data from a packet received via the bus 4 and outputs it to the control unit 12 or the application unit 15.

The IEEE-1394 communication unit 11 issues and sends a request packet for reading, writing, locking and others. Further, the IEEE-1394 communication unit 11 also illustratively issues and sends a response packet and an acknowledgement packet in response to the above requests.

The control unit 12 controls each unit according to instructions from the application unit 15. For example, when the control unit 12 receives a request for issuing a request packet for reading and locking from the application unit 15, the control unit 12 instructs the IEEE-1394 communication unit 11 to issue the request packet.

The RAM 13 is defined so that it functions as control and status registers (CSR) for the IEEE-1394 Standard and suitably stores data, a program and others respectively required for the control unit 12 to execute various processing. The ROM 14 includes configuration ROM. Various programs, various parameters and others are stored in ROM 14.

the application unit 15 gives instructions relating to the setting required for isochronous transaction at IRM 5 and the bridge 6 to the control unit 12 or the IEEE-1394 communication unit 11. The application unit 15 can display the result of communication on, for example, a monitor not shown.

Figure 6:
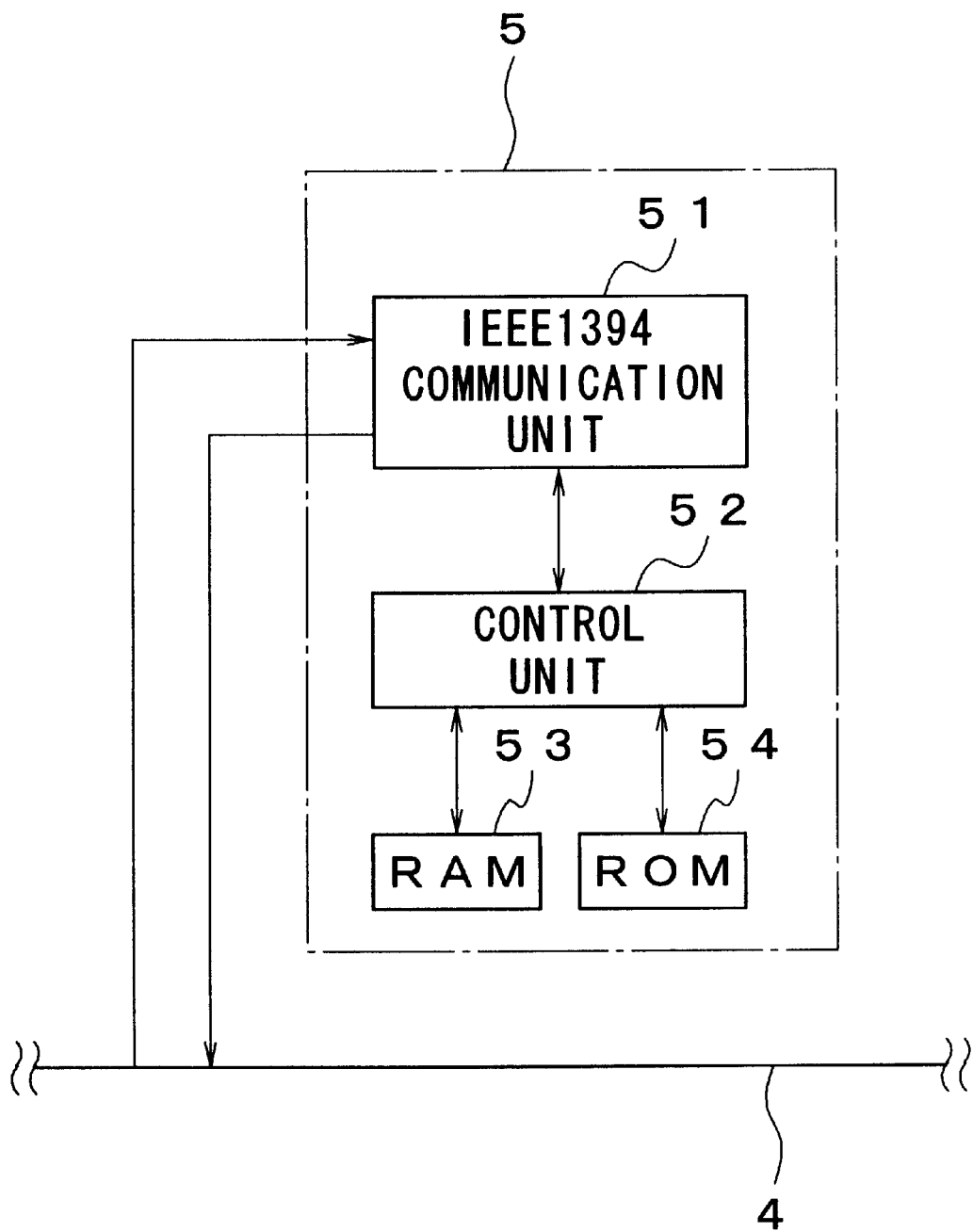
FIG. 6 is a block diagram showing the configuration of IRM.

FIG. 6 shows the configuration of the IRM 5. The IRM 5 is a node of the IEEE-1394 bus and is composed of an IEEE-1394 communication unit 51, a control unit 52, RAM 53 and ROM 54.

The control unit 52 controls the IEEE-1394 communication unit 51 wherein data supplied from the control unit 52 is packed. The IEEE-1394 communication unit 51 sends the above IEEE-1394 packet via the bus 4, extracts the data from a packet received via the bus 4 and outputs it to the control unit 52.

The ROM 54 includes configuration ROM. Various programs, various parameters and others are stored in the ROM 54.

The RAM 53 is defined so that it functions as CSR of the IEEE-1394 Standard and suitably stores data, a program and others respectively required for the control unit 52 to execute various processing. A control and status register (CSR) of RAM 53 includes areas for a BANDWIDTH_AVAILABLE register and a CHANNEL_AVAILABLE register.

The BANDWIDTH_AVAILABLE register and the CHANNEL_AVAILABLE register will be described with reference to FIGS. 7 and 8.

Figure 7:
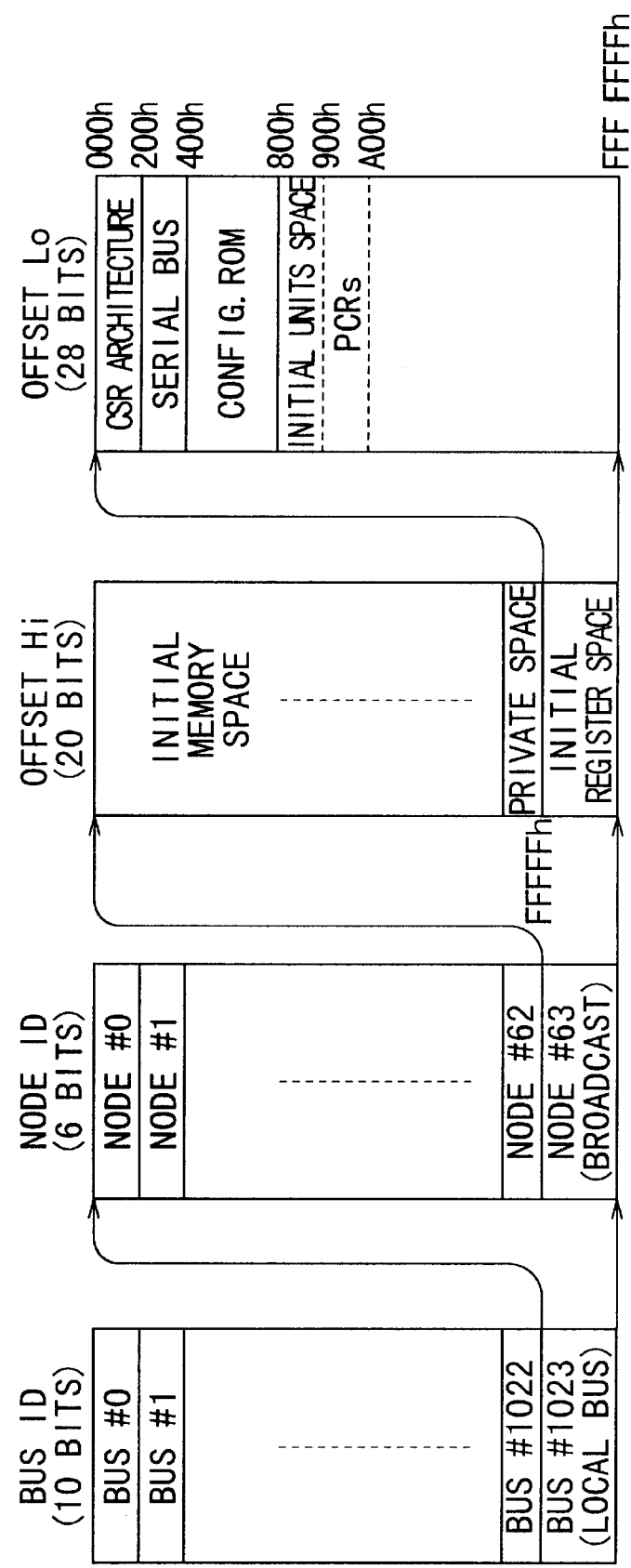
FIG. 7 is a block diagram showing the structure of the address space of CSR architecture.

The structure of the CSR architecture address space is illustrated in FIG. 7.

In such structure, the upper 16 bits form a node ID representing one of the IEEE 1394 nodes and the other 48 bits are used to designate address space assigned to each node.

The upper 16 bits are separated into a bus ID of 10 bits and a physical ID of 6 bits. Since the case in which all of the bits are set to 1 is reserved for a special purpose, 1023 buses and 63 nodes can be designated.

The space prescribed with the upper 20 bits of the address space of 256 terabytes prescribed with the lower 48 bits is separated into an initial register space such as a CSR specific register, an IEEE-1394 specific register of 2048 bytes, a private space, an initial memory space and so on.

The space prescribed with the lower 28 bits is used as a configuration read-only memory (ROM), an initial unit space for use specific to the nodes, plug control registers (PCRs) and so forth, if an initial register space is prescribed with the upper 20 bits.

Offset addresses, names and functions of essential CSRs are illustrated in FIG. 8. The offsets shown in FIG. 8 are addresses offset from address FFFFF0000000h (in which "h" denotes hexadecimal notation) starting the initial register space. A BANDWIDTH_AVAILABLE register is allocated to the offset 220h and stores a band assignable to isochronous communication. In the BANDWIDTH_AVAILABLE register, a maximum value may be stored when no band is assigned for isochronous communication and the value may be reduced each time a band is assigned.

CHANNEL_AVAILABLE register is allocated to the offsets 224 h to 228 h and has bits corresponding to channel numbers 0 to 63. A bit having a value of zero may indicate that the corresponding channel has been assigned.

Figure 9:
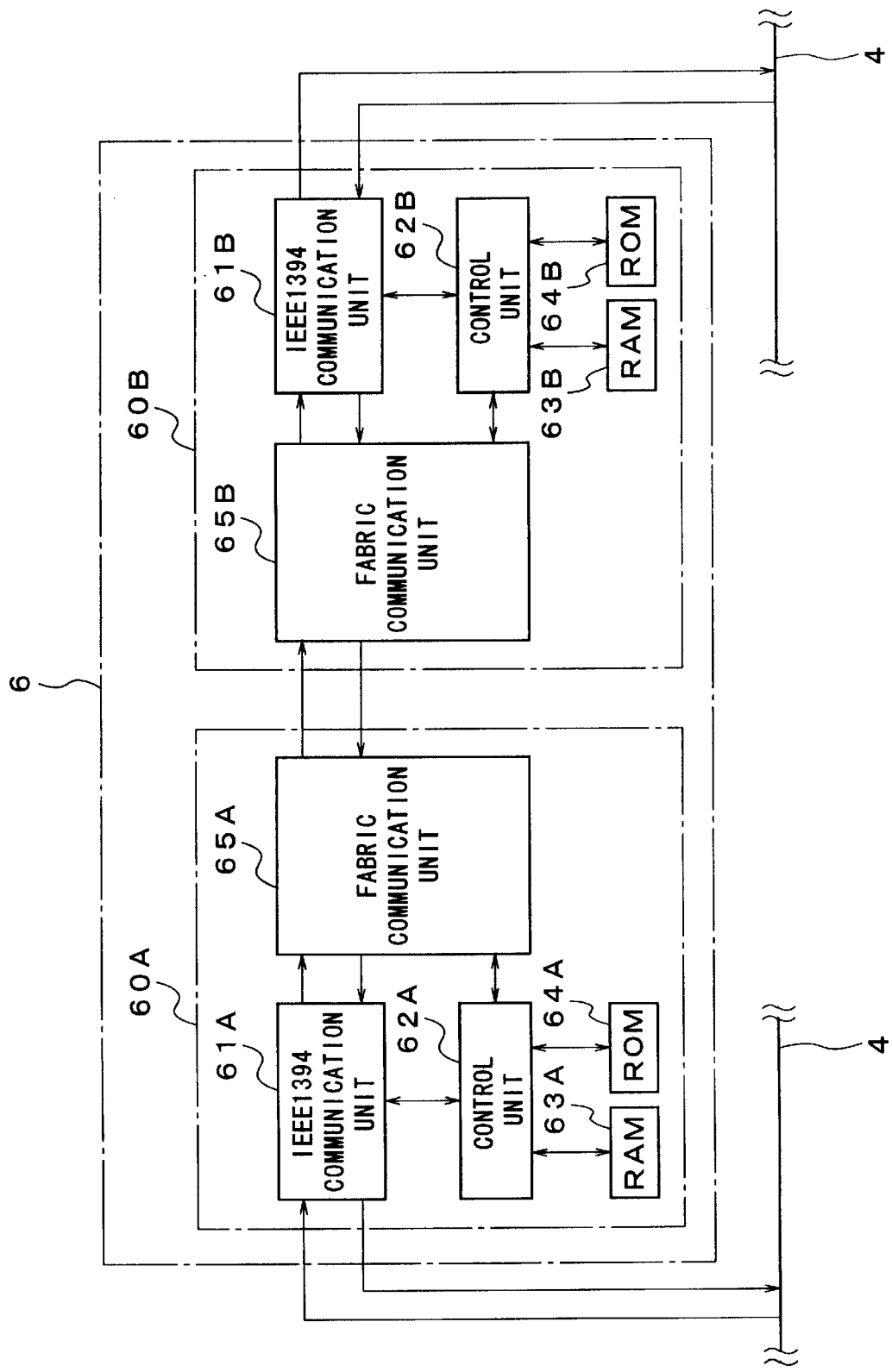
FIG. 9 is a block diagram showing the configuration of a bridge.

FIG. 9 shows the configuration of the bridge 6. The bridge 6 is equipment for connecting the IEEE-1394 buses 4, 4 and is composed of two portals 60A and 60B as first and second communication means, which are connected. The portals 60A and 60B respectively are nodes of the IEEE-1394 bus. The two portals may be composed of one apparatus.

The portal 60A is composed of an IEEE-1394 communication unit 61A, a control unit 62A, RAM 63A, ROM 64A and a fabric communication unit 65A. Similarly, the portal 60B is composed of an IEEE-1394 communication unit 61B, a control unit 62B, RAM 63B, ROM 64B and a fabric communication unit 65B.

The RAMs 63A and 63B respectively function as CSR for the IEEE-1394 Bridge. They respectively secure a register area defined for the IEEE-1394 bridge such as a streams available register and in addition, an area for a group of registers defined in IEEE 1394–1995 (IEEE 1394).

The ROMs 64A and 64B also similarly follow a format of the IEEE-1394 Bridge and a format defined in IEEE 1394–1995. They respectively include configuration ROM and store various programs, various parameters and others.

The control units 62A, 62B respectively control the IEEE-1394 communication units 61A, 61B wherein data supplied from the control units 62A, 62B respectively are packed. The IEEE-1394 communication units 61A, 61B respectively send the packet data via the buses 4, 4 or the fabric communication units 65A, 65B. They respectively extract the data from a packet data received via the buses 4, 4, and output the data to the control units 62A, 62B or the fabric communication units 65A, 65B. Further, they respectively extract the data from a packet data received via the fabric communication units 65A, 65B and respectively output the data to the control units 62A, 62B or the buses 4, 4.

As described above, the portals 60A and 60B constituting the bridge 6 are respectively provided with the fabric communication units 65A, 65B. A pair of fabric communication units 65A, 65B functions as the fabric of the IEEE-1394 Bridge.

The control units 62A, 62B respectively control the fabric communication units 65A, 65B wherein data sent from the IEEE-1394 communication units 61A, 61B are respectively received. The IEEE-1394 communication units 61A, 61B respectively send the data to the other fabric communication units 65B, 65A. The fabric communication units 65A, 65B respectively send data sent from the other fabric communication units 65B 65A to the IEEE-1394 communication units 61A, 61B and the control units 62A, 63B.

Isochronous Transaction Setting Method

Next, a isochronous transaction setting method in the above bus network will be described.

Referring to a flowchart shown in FIG. 10, the operation for setting isochronous transaction of the owner 1 will be described below.

The owner 1 executes operation for setting isochronous transaction using talker bus ID, talker physical ID, listener bus ID, listener physical ID and the information of isochronous transaction bandwidth. In this embodiment, it is a premise that the above information is already known. The owner 1 executes steps in the flowchart shown in FIG. 10 when it sets isochronous transaction.

In a step ST101, it is judged whether the local bus ID is equal to the talker bus ID or not. When they are different, the process proceeds to a step ST102. When they are the same, the process proceeds to a step ST104. If the owner 1 and the talker 2 exist on the same bus 4, local bus ID and talker bus ID are equal (see FIGS. 2A and 2C). In the step ST102, TOIP is set to 0 (zero).

In the step ST103, talker bus ID is substituted for destination bus ID and the process proceeds to a step ST109.

In the meantime, in the step ST104, TOIP is set to 1. Next, in a step ST105, the isochronous transaction of a local bus is set. In this case, a node for setting isochronous transaction (the owner 1) subtracts a value of bandwidth used for isochronous transaction from a value of bandwidth represented by the BANDWIDTH_AVAILABLE register of RAM 53 in IRM 5 existing on the local bus (the bus 4 to which the owner 1 is connected), and then updates the BANDWIDTH_AVAILABLE register so that the register has a value acquired by the above subtraction.

Further, the node for setting isochronous transaction retrieves the number of an unused channel based upon the value of the CHANNEL_AVAILABLE register of the RAM 53 in the IRM 5, selects one of the numbers and declares that it is used for isochronous transaction. The above processes are executed using lock transaction called compare and swap and read transaction.

Next, in a step ST106, it is judged whether the setting of isochronous transaction for the local bus in the step ST105 succeeds or not. When the setting succeeds, the process proceeds to a step ST107. When the setting fails, the process proceeds to a step ST116. For a case that the setting of isochronous transaction fails, a case that a value of band capacity represented by the BANDWIDTH_AVAILABLE register is smaller than a value of bandwidth used for isochronous transaction or a case that there is no number of an unused channel is conceivable.

In the step ST107, it is judged whether local bus ID is equal to listener bus ID or not. When they are different, the process proceeds to a step ST108. When they are the same, the process proceeds to a step ST113. If the owner 1 and the listener 3 exists on the same bus 4, local bus ID and listener bus ID are equal (see FIG. 2A). In the step ST108, listener bus ID is substituted for destination bus ID and the process proceeds to the step ST109.

In the step ST109, target node ID is retrieved. Target node ID means the node ID of a portal of the bridge 6, which exists on the bus 4 connecting to the owner 1 and which exists on a path toward the bus 4 having the same bus ID as destination bus ID.

An example of a method of retrieving target node ID will be described below.

A node for retrieving target node ID executes the following steps ST109-1 to ST109-3.

[Step ST109-1]

First, routing information stored in all portals of the bridge existing on the local bus is read, and then the node ID and the routing information of the bridge portal are stored.

Routing information is stored in ROUTING_BOUNDS register mentioned in the bridge draft or a register like the above register. For the similar register, there is a 1023-bit register (ROUTING_TABLE) corresponding to bus ID 0 to 1022 in order from the most significant bit (MSB). When a value of the 'i'th bit of the register is 1, a portal of bridge possessing the register passes a packet the destination of which has bus ID of 'i'. Similarly, when a value of the 'i'th bit is 0, the above portal of bridge does not pass a packet the destination of which has bus ID of 'i'.

[Step ST109-2]

Next, a portal of bridge, which passes a packet having certain destination bus ID, is retrieved based upon information acquired in the step ST109-1. If the above 1023-bit register is used for a method of storing routing information, a bridge portal having the register wherein its bit corresponding to the destination bus ID is 1 is selected. The above processing is equivalent to read transaction in IEEE 1394 and all portals of bridge existing on the local bus can be retrieved by reading the routing information of all the bridge portals.

[Step ST109-3]

The node ID of the portal of bridge retrieved in the step ST109-2 is set as target node ID.

After target node ID is retrieved in the step ST109 as described above, command information is sent to a target node in a step ST110. In this case, the owner 1 functions as an initiator and sends TOIP, talker bus ID, talker physical ID, listener bus ID, listener physical ID, isochronous transaction bandwidth and isochronous transaction channel number to the target node.

The isochronous transaction channel number is a value acquired by setting the isochronous transaction of the local bus in the step ST105.

The process proceeds to the step ST102 based upon the judgment in the step ST101. When the processing the step ST105 is not executed, a suitable value (for example, 0) is given as a isochronous transaction channel number.

The above command information is transmitted using write transaction and lock transaction. A target node recognizes that a request for setting isochronous transaction is made when command information is stored in a predetermined area of RAM.

Next, in a step ST111, a response from the target node of the request for setting isochronous transaction is awaited.

In a step ST112, it is judged whether a received response is a fail response or a complete response. When the received response is a complete response, the process proceeds to a step ST113. When the received response is a fail response, the process proceeds to a step ST114.

In the step ST113, it is verified that setting for isochronous transaction succeeds and the process is terminated.

In the step ST114, it is judged whether TOIP is 1 or not. When TOIP is 1, the process proceeds to a step ST115. When TOIP is 0, the process proceeds to a step ST116.

If TOIP is 1, the isochronous transaction of the local bus is set in the step ST105. Therefore, in the step ST115, the setting of isochronous transaction is released. When the setting of isochronous transaction for the local bus is released, releasing processing is also executed for IRM 5 as in the case of setting the isochronous transaction of the local bus. That is, a node for releasing the setting of isochronous transaction (the owner 1) adds a value of bandwidth reserved for isochronous transaction to a value of bandwidth represented by the BANDWIDTH_AVAILABLE register in IRM 5 and then updates the BANDWIDTH_AVAILABLE register so that the register has a value after addition.

Further, the node for releasing the setting of isochronous transaction executes processing for returning a reserved channel number to the channels available register. The above processing is also executed using lock transaction and read transaction.

After the setting of isochronous transaction is released in the step ST115, the process proceeds to the step ST116. In the step ST116, it is verified that the setting of isochronous transaction fails and the process is terminated.

Next, referring to a flowchart shown in FIG. 11, the operation for setting isochronous transaction of a portal which receives a request for setting isochronous transaction from the owner 1 or a portal constituting the other bridge 6 and others will be described. When the initiator sends TOIP, talker bus ID, talker physical ID, listener bus ID, listener physical ID, isochronous transaction bandwidth and a isochronous transaction channel number to the portal to request (instruct) the setting of isochronous transaction, the above portal stores initiator node ID and executes steps in the flowchart shown in FIG. 11. The initiator node ID is used in steps ST309 and ST312 described later.

In a step ST301, an identification number "cid" for discriminating the above request from the other request is aquired to prevent the above request from being mistaken for the other request. To acquire the above "cid", the initial value of "cid" is set to 0, for example, and the value is incremented by one each time a request for setting isochronous transaction is made. The value of "cid" may be 0 to 1023. A value "cid" is common in the bridge 6. That is, in the above case, 1024 requests can be discriminated in one bridge.

Next, in a step ST302, it is judged whether the acquisition of unused "cid" is impossible or not. When the acquisition is impossible, the process proceeds to a step ST312. When the acquisition is possible, the process proceeds to a step ST303.

In the step ST303, a value of TOIP received from the initiator is substituted for OIP[cid] and the process proceeds to a step ST304.

In the step ST304, it is judged whether OIP[cid] is 1 or not. When OIP[cid] is 1, the process proceeds to a step ST305. When OIP[cid] is 0, the process proceeds to a step ST306.

In the step ST305, the setting of a portal is made. The setting of a portal shall follow a method defined in the bridge draft. In the bridge draft, a stream control register is provided to all portals and secures an area for storing the number of a channel connected to the portal for isochronous transaction. The writing of information such as the number of a channel passing a bridge for isochronous transaction to the stream control register allows the portal to set.

After the portal is set in the step ST305, the process proceeds to the step ST306.

In the step ST306, the portal sends OIP[cid], "cid", talker bus ID, talker physical ID, listener bus ID, listener physical ID and isochronous transaction bandwidth to the other portal and requests the other portal to set the isochronous transaction.

Next, in a step ST307, a response from the other portal for the request for setting isochronous transaction is waiting.

In a step ST308, it is judged whether a received response is a fail response or a complete response. When the received response is a complete response, the process proceeds to a step ST309. When the received response is a fail response, the process proceeds to a step ST310.

In the step ST309, the portal sends the complete response showing that the setting of isochronous transaction succeeds to the initiator using the above initiator ID.

In the step ST310, it is judged whether OIP[cid] is 1 or not. When OIP[cid] is 1, the process proceeds to a step ST311. When OIP[cid] is 0, the process proceeds to a step ST312.

When OIP[cid] is 1, the setting of a portal has been made in the step ST305. Therefore, in the step ST311, the setting of the portal is released. The release of the setting of the portal is also executed according to the method defined in the bridge draft. The releasing processing is the converse of setting processing and processing such as initializing information written to the STREAM_CONTROL register in setting is executed.

After the setting of a portal is released in the step ST311, the process proceeds to the step ST312.

In the step ST312, the portal sends the fail response showing that setting for isochronous transaction fails to the initiator using the above initiator ID.

Referring to a flowchart shown in FIG. 12, when a portal receives a request for setting isochronous transaction from a portal (the other portal) constituting the same bridge, the operation for setting isochronous transaction for a portal of another bridge will be described.

Figure 12:
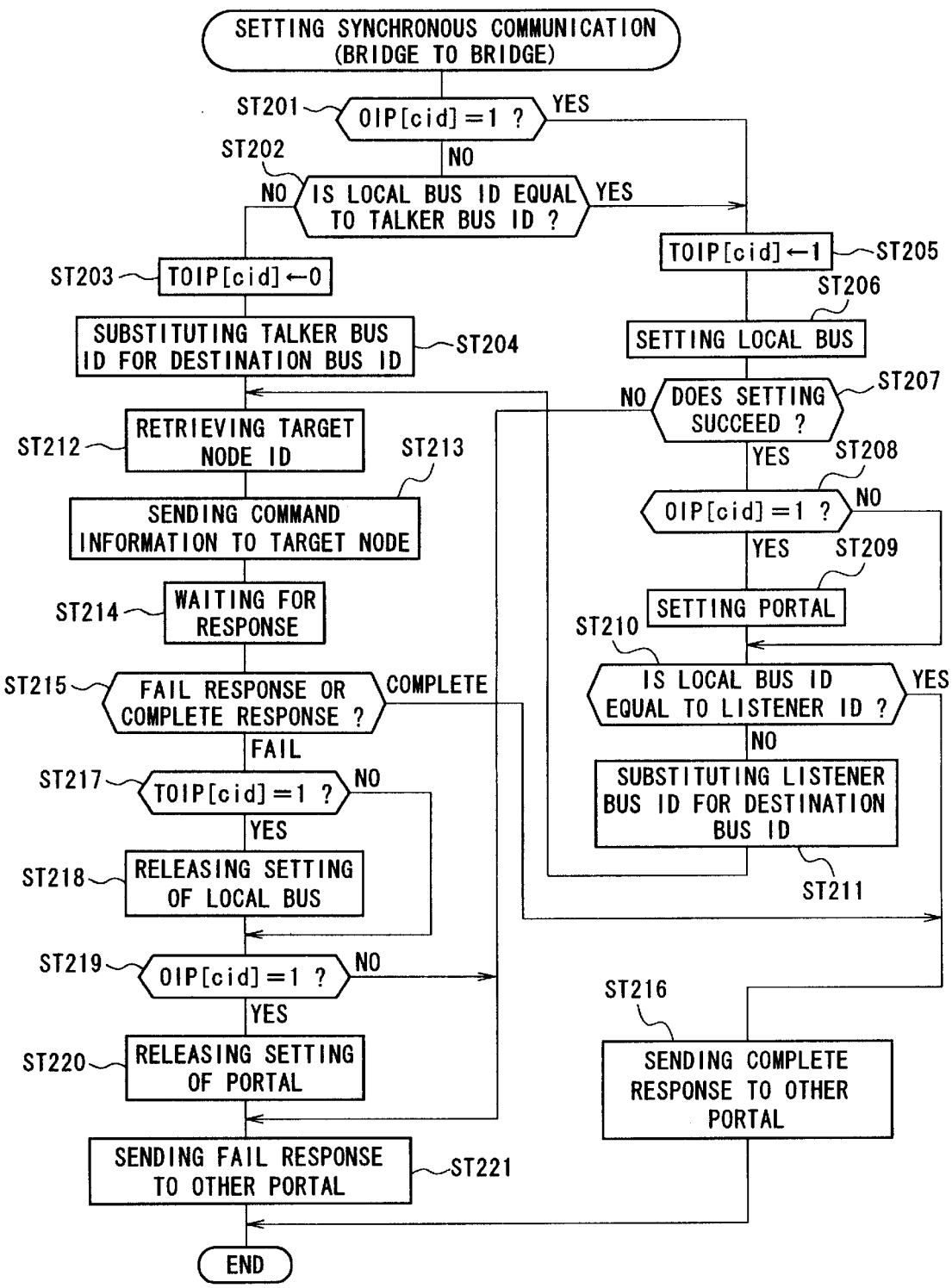
FIG. 12 is a flowchart showing an operation for setting isochronous transaction from the bridge to other bridge.

When the above other portal sends OIP[cid], "cid", talker bus ID, talker physical ID, listener bus ID, listener physical ID and isochronous transaction band capacity to the above portal of another bridge to request (instruct) the setting of isochronous transaction, the above portal executes steps shown in the flowchart in FIG. 12.

In a step ST201, it is judged whether OIP[cid] is 1 or not. When OIP[cid] is 0, the process proceeds to a step ST202. When OIP[cid] is 1, the process proceeds to a step ST205.

In the step ST202, it is judged whether local bus ID and talker bus ID are equal or not. When they are different, the process proceeds to a step ST203. When they are equal, the process proceeds to the step ST205.

In the step ST203, TOIP [cid] is set to 0. This is because, if the above portal does not exist on a path from the talker 2 to the listener 3 (OIP [cid] is 0) and the talker 2 does not exist on a local bus, a target node (a portal of a bridge on a path toward the local bus on which the talker 2 exists) retrieved as described later does not exist on a path from the talker 2 to the listener 3.

In a step ST204, the talker bus ID is substituted for the destination bus ID and the process proceeds to a step ST212.

In the meantime, in the step ST205, TOIP [cid] is set to 1. This is because, if the above portal exists on a path from the talker 2 to the listener 3 (OIP [cid] is 1) or the talker 2 exists on the local bus, a target node (a portal of a bridge on a path toward the local bus on which the listener 3 exists) retrieved as described later exists on a path from the talker 2 to the listener 3.

In a step ST206, the isochronous transaction of the local bus is set. In this case, a node for setting isochronous transaction (a portal) subtracts a value of bandwidth used for isochronous transaction from a value of band capacity represented by the BANDWIDTH_AVAILABLE register of RAM 53 in IRM 5 existing on the local bus and updates the BANDWIDTH_AVAILABLE register so that the register has the subtracted value.

Further, the node for setting isochronous transaction retrieves the numbers of unused channels based upon a value of the channels available register of RAM 53 in the above IRM 5, selects one of the numbers and declares that a channel having the selected number is used for isochronous transaction. The above processing is executed using lock transaction and read transaction as in the step ST105 shown in FIG. 10.

In a step ST207, it is judged whether the setting of isochronous transaction for the local bus in the step ST206 succeeds or not. When the setting succeeds, the process proceeds to a step ST208. When the setting fails, the process proceeds to a step ST221.

In the step ST208, it is judged whether OIP [cid] is 1 or not. When OIP [cid] is 1, the process proceeds to a step ST209. When OIP [cid] is 0, the process proceeds to a step ST210. As the above portal exists on a path from the talker 2 to the listener 3 and the setting of the portal is required in case OIP [cid] is 1, the process proceeds to the step ST209.

In the step ST209, the portal is set. The above setting of the portal shall be made according to the method defined in the bridge draft. The setting of the portal is made by writing information such as the number of a channel passing a bridge for isochronous transaction to the stream control register, as in the step ST305 shown in FIG. 11.

After the portal is set in the step ST209, the process proceeds to the step ST210.

In the step ST210, it is judged whether local bus ID and listener bus ID are equal or not. When they are different, the process proceeds to a step ST211. When they are equal, the process proceeds to a step ST216.

If the above portal and the listener 3 exist on the same bus 4, local bus ID and listener bus ID are equal.

In the step ST211, the listener bus ID is substituted for the destination bus ID and the process proceeds to the step ST212.

In the step ST212, target node ID is retrieved. Target node ID means the node ID of a portal of the bridge 6 existing on the bus on which the above portal exists and existing on a path toward the bus 4 having the same bus ID as destination bus ID. The target node ID is retrieved according to the similar method to the method described in relation to the step ST109 shown in FIG. 10. In this case, if the listener 3 exists nearer to the owner 1 than the talker 2 (see FIGS. 3A and 4A), the node ID of the above portal is target node ID.

After the target node ID is retrieved in the step ST212, the portal sends command information to the target node in a step ST213. In this case, the portal functions as an initiator and sends TOIP [cid] to the target node as TOIP. Further the portal sends talker bus ID, talker physical ID, listener bus ID, listener physical ID, isochronous transaction band capacity and a isochronous transaction channel number to the target node.

The above isochronous transaction channel number is a value acquired by the setting of isochronous transaction for the local bus in the step ST206. When the process proceeds to the step ST203 based upon the judgment in the step ST202 and the processing in the step ST206 is not executed, a suitable value such as 0 is given as a isochronous transaction channel number.

Command information is sent using write transaction and lock transaction. The target node recognizes that a request for setting isochronous transaction is made, when the command information is stored in a predetermined area of RAM. If the node ID of the above portal is retrieved as the target node ID in the step ST212, the portal functions as an initiator and requests the portal itself to set isochronous transaction.

The requests for setting isochronous transaction, namely, a precedent request and a new request, are discriminated based upon the respective identification numbers, "cid". The portal which receives a request for setting isochronous transaction twice on both ways, a precedent request and a new request, similarly discriminates the requests on both ways based upon the respective identification numbers, "cid".

In a step ST214, a response for a request for setting isochronous transaction from the target node is waiting.

In a step ST215, it is judged whether a received response is a fail response or a complete response. When the received response is a complete response, the process proceeds to the step ST216. When the received response is a fail response, the process proceeds to a step ST217.

In the step ST216, the portal sends a complete response showing the setting of isochronous transaction succeeds to the other portal.

In the step ST217, it is judged whether TOIP [cid] is 1 or not. When TOIP [cid] is 1, the process proceeds to a step ST218. When TOIP [cid] is 0, the process proceeds to a step ST219.

When TOIP [cid] is 1, the setting of isochronous transactions for the local bus has been made in the step ST206. Therefore, in the step ST218, the setting for isochronous transaction is released.

When the setting of isochronous transaction for the local bus is released, releasing processing is also executed for IRM 5 as in the case of the setting of isochronous transaction for the local bus. That is, the node for releasing the setting for isochronous transaction (the portal in this case) adds a value of bandwidth reserved for isochronous transaction to a value of bandwidth represented by the BANDWIDTH_AVAILABLE register in IRM 5 and updates the BANDWIDTH_AVAILABLE register so that the register has the added value.

Further, the node for releasing setting for isochronous transaction executes processing for returning a reserved channel number to the CHANNELS_AVAILABLE register.

The above processing is also executed using lock transaction and read transaction.

After the setting for isochronous transaction is released in the step ST218, the process proceeds to the step ST219.

In the step ST219, it is judged whether OIP [cid] is 1 or not. When OIP [cid] is 1, the process proceeds to a step ST220. When OIP [cid] is 0, the process proceeds to a step ST221.

When OIP [cid] is 1, setting for the portal has been made in the step ST209. Therefore, in the step ST220, the setting for the portal is released. The release of the setting for the portal is also executed according to the method defined in the bridge draft. Releasing processing is the converse of setting processing and information written to the STREAM_CONTROL register in setting is initialized, for example.

After the setting for the portal is released in the step ST220, the process proceeds to the step ST221.

In the step ST221, the portal sends a fail response showing that setting for isochronous transaction fails to the other portal and the process is terminated.

Next, operation for setting isochronous transaction in case the owner 1, the talker 2 and the listener 3 are arranged as shown in FIGS. 2A to 2C, FIGS. 3A and 3B and FIGS. 4A and 4B will be described briefly.

Operation for setting isochronous transaction in the example of arrangement shown in FIG. 2A will be described below.

Figure 10:
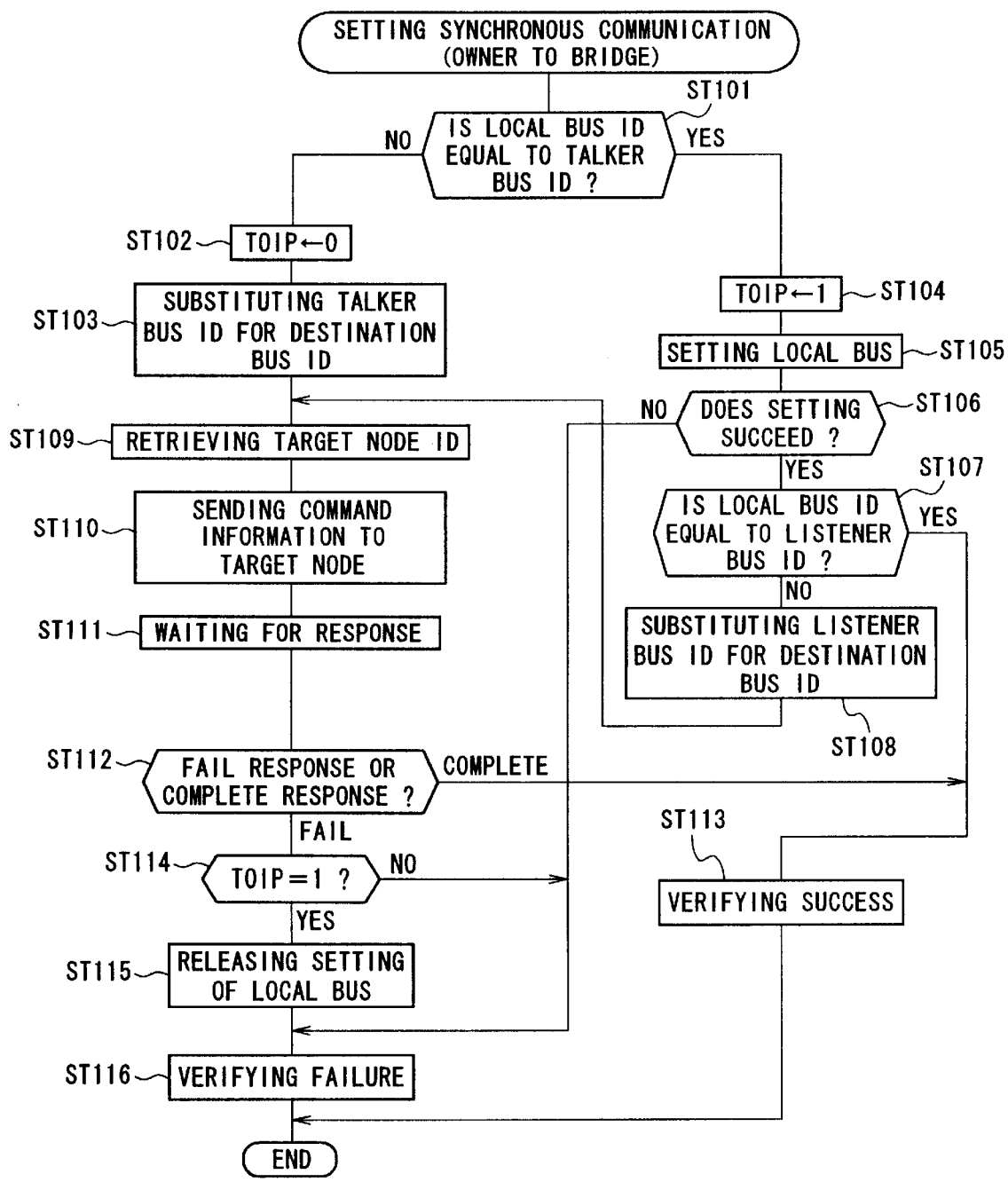
FIG. 10 is a flowchart showing an operation for setting isochronous transaction from the owner to the bridge.

First, the owner 1 starts operation for setting isochronous transaction as shown in the flowchart in FIG. 10. In this case, as the owner 1 and the talker 2 exist on the same bus 4, TOIP is set to 1 in the step ST104. In the step ST105, the isochronous transaction for the local bus 4 is set.

As the owner 1 and the listener 3 exist on the same bus 4 (step ST107), it is verified that setting for isochronous transaction succeeds in the step ST113. The process is terminated.

As described above, when the owner 1, the talker 2 and the listener 3 are located in positional relationship shown in FIG. 2A, the process for setting isochronous transaction is finished by only the operation for setting isochronous transaction of the owner 1.

Operation for setting isochronous transaction in the example of arrangement shown in FIG. 2B will be described below.

First, the owner 1 starts operation for setting isochronous transaction according to the flowchart shown in FIG. 10. In this case, as the owner 1 and the talker 2 respectively exist on different buses 4A and 4B, TOIP is set to 0 in the step ST102. The owner 1 sends command information to the portal 60A, as a target node, of the bridge 6 on a path toward the local bus 4B on which the talker 2 exists in the step ST110 to request the setting of isochronous transaction therefor.

Figure 11:
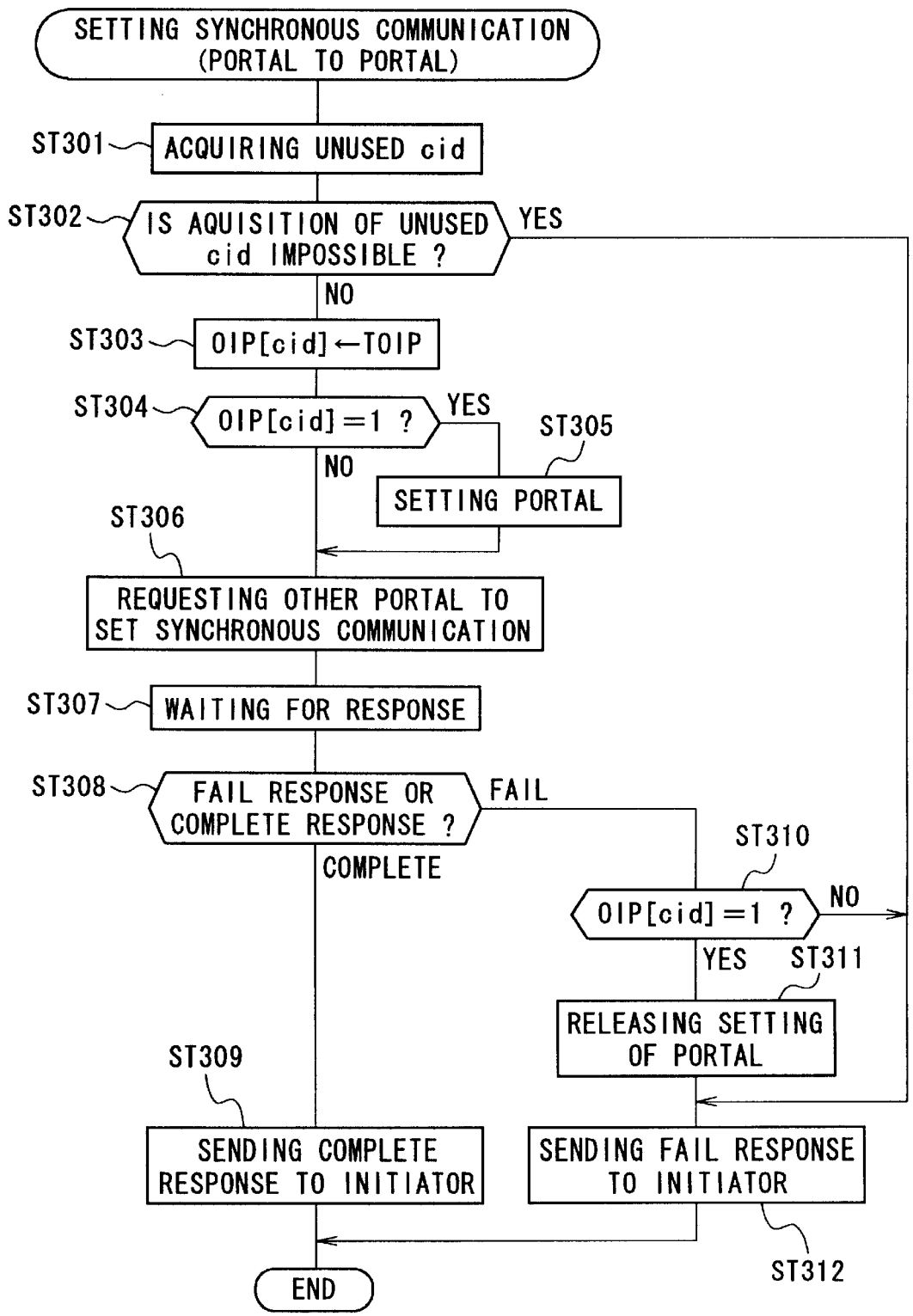
FIG. 11 is a flowchart showing an operation for setting isochronous transaction from the portal to other portal.

The portal 60A received the request for setting isochronous transaction starts operation for setting isochronous transaction according to the flowchart shown in FIG. 11. In this case, as the portal 60A does not exist on a path from the talker 2 to the listener 3, OIP [cid] is 0 in the step ST304 and then the above portal 60A is not set. Therefore, in the step ST306, the portal 60A requests the other portal 60B to set the isochronous transaction therefor.

The portal 60B received the request for setting isochronous transaction starts operation for setting isochronous transaction according to the flowchart shown in FIG. 12.

As OIP [cid] is 0, the process proceeds to the step ST202.

As the talker 2 exists on the local bus 4B, the process proceeds to the step ST205 according to the judgment in the step ST202. In the step ST205, TOIP [cid] is set to 1.

In the step ST206, the isochronous transaction for the local bus 4B is set. As OIP [cid] is 0, the process proceeds to the step ST210 according to the judgment in the step ST208 and no setting for the portal 60B is made.

As the listener 3 exists on the local bus 4B, the process proceeds to the step ST216 according to the judgment in the step ST210. In the step ST216, the portal 60B sends a complete response showing that setting for isochronous transaction succeeds to the other portal 60A. The process as shown in FIG. 12 is terminated.

When the portal 60A receives the complete response, the process proceeds to the step ST309 according to the judgment in the step ST308 shown in FIG. 11. The portal 60A sends a complete response to the owner 1, which is an initiator. The process as shown in FIG. 11 is terminated.

When the owner 1 receives the complete response, the process proceeds to the step ST113 according to the judgment in the step ST112 shown in FIG. 10. In the step ST113, it is verified that setting for isochronous transaction succeeds. The process is terminated completely.

In FIG. 2B, the buses 4A and 4B are adjacent. However, if one or plural buses 4 exist between these buses 4A and 4B, the above operations in the flowcharts shown in FIGS. 11 and 12 are sequentially alternately executed. As for operation for setting isochronous transaction in the examples of arrangement shown in FIGS. 2C, 3A, 3B, 4A and 4B, this is similar.

Operation for setting isochronous transaction in the example of arrangement shown in FIG. 2C will be described below.

First, the owner 1 starts operation for setting isochronous transaction according to the flowchart shown in FIG. 10. In this case, as the owner 1 and the talker 2 exist on the same bus 4A, TOIP is set to 1 in the step ST104. In the step ST105, the isochronous transaction for the local bus 4A is set.

As the owner 1 and the listener 3 respectively exist on the different buses 4A and 4B, the process proceeds to the step ST108 according to the judgment in the step ST107. In the step ST108, the owner 1 sends the command information to the portal 60A, as a target node, of the bridge 6 on a path toward the local bus 4B on which the listener 3 exists in the step ST110 and requests the portal 60A to set the synchronous communication therefor.

The portal 60A received the request for setting isochronous transaction starts operation for setting isochronous transaction according to the flowchart shown in FIG. 11. In this case, as the portal 60A exists on a path from the talker 2 to the listener 3, OIP [cid] is 1. Therefore, the process proceeds to the step ST305 according to the judgment in the step ST304. In the step ST305, the above portal 60A is set and afterward, in the step ST306, the portal 60A requests the other portal 60B to set the isochronous transaction therefor.

The portal 60B received the request for setting isochronous transaction starts operation for setting isochronous transaction according to the flowchart shown in FIG. 12. In this case, as OIP [cid] is 1, the process proceeds to the step ST205 according to the judgment in the step ST201. In the step ST205, TOIP [cid] is set to 1.

In the step ST206, the isochronous transaction for the local bus 4B is set. Then, as OIP [cid] is 1, the process proceeds to the step ST209 according to the judgment in the step ST208. In the step ST209, the portal 60B is set.

Further, as the listener 3 exists on the local bus 4B, the process proceeds to the step ST216 according to the judgment in the step ST210. In the step ST216, the portal 60B sends a complete response showing that setting for isochronous transaction succeeds to the other portal 60A. The process as shown in FIG. 12 is terminated.

When the portal 60A receives the complete response, the process proceeds to the step ST309 according to the judgment in the step ST308 shown in FIG. 11.

In the step ST309, the portal 60A sends a complete response to the owner 1, which is an initiator. The process as shown in FIG. 11 is terminated.

When the owner 1 receives the complete response, the process proceeds to the step ST113 according to the judgment in the step ST112 shown in FIG. 10. In the step ST113, it is verified that setting for isochronous transaction succeeds. The process is terminated completely.

Operation for setting isochronous transaction in the example of arrangement shown in FIG. 3A will be described below.

First, the owner 1 starts operation for setting isochronous transaction according to the flowchart shown in FIG. 10. In this case, as the owner 1 and the talker 2 respectively exist on the different buses 4A and 4B, TOIP is set to 0 in the step ST102. In the step ST110, the owner 1 sends the command information to the portal 60A, as a target node, of the bridge 6 on a path toward the local bus 4B on which the talker 2 exists. The owner 1 requests the portal 60A to set the isochronous transaction therefor (a1).

The portal 60A received the request (a1) for setting isochronous transaction starts operation for setting isochronous transaction according to the flowchart shown in FIG. 11. In this case, as OIP[cid] is 0, the process proceeds to the step ST306 according to the judgment in the step ST304. In the step ST306, the portal 60A requests the other portal 60B to set the synchronous communication therefor (a2) without setting for the above portal.

The portal 60B received the request (a2) for setting isochronous transaction starts operation for setting isochronous transaction according to the flowchart shown in FIG. 12. In this case, as the talker 2 exists on the local bus 4B, the process proceeds to the step ST205 according to the judgment in the step ST202.

In the step ST205, TOIP[cid] is set to 1. In the step ST206, the isochronous transaction for the local bus 4B is set.

As OIP[cid] is 0, the process proceeds to the step ST210 according to the judgment in the step ST208 and no setting for the portal is made.

As the listener 3 does not exist on the local bus 4B, the process proceeds to the step ST211 according to the judgment in the step ST210.

In the step ST212, the node ID of the portal 60B of the bridge 6 on a path toward the local bus 4A on which the listener 3 exists is set as target node ID. That is, in this case, the portal 60B itself functions as a target node. In the step ST213, the portal 60B requests the portal 60B itself to set the isochronous transaction (b1).

The portal 60B received the request (b1) for setting isochronous transaction starts operation for setting isochronous transaction according to the flowchart shown in FIG. 11. In this case, as the portal 60B exists on a path from the talker 2 to the listener 3, OIP[cid] is 1. Therefore, the process proceeds to the step ST305 according to the judgment in the step ST304. In the step ST305, the above portal 60B is set and afterward, in the step ST306, the portal 60B requests the other portal 60A to set the synchronous communication (b2) therefor.

The portal 60A received the request (b2) for setting isochronous transaction starts operation for setting isochronous transaction according to the flowchart shown in FIG. 12. In this case, as the portal 60A exists on a path from the talker 2 to the listener 3, OIP[cid] is 1. Therefore, TOIP[cid] is set to 1 in the step ST205. In the step ST206, the isochronous transaction for the local bus 4A is set.

As OIP[cid] is 1, the process proceeds to the step ST209 according to the judgment in the step ST208. In the step ST209, the above portal 60A is set.

As the listener 3 exists on the local bus 4A, the process proceeds to the step ST216 according to the judgment in the step ST210. In the step ST216, the portal 60A sends a complete response showing that setting for isochronous transaction succeeds to the other portal 60B. The process related to the request (b2) is terminated.

When the portal 60B receives the complete response, the process proceeds to the step ST309 according to the judgment in the step ST308 shown in FIG. 11. In the step ST309, the portal 60B sends a complete response to the portal 60B itself, which is an initiator. The process related to the request (b1) is terminated.

When the portal 60B receives the complete response, the process proceeds to the step ST216 according to the judgment in the step ST215 shown in FIG. 12. In the step SR216, the portal 60B sends a complete response to the other portal 60A. The process related to the request (a2) is terminated.

When the portal 60A receives the complete response, the process proceeds to the step ST309 according to the judgment in the step ST308 shown in FIG. 11. In the step ST309, the portal 60A sends a complete response to the owner 1, which is an initiator. The process related to the request (a1) is terminated.

When the owner 1 receives the complete response, the process proceeds to the step ST113 according to the judgment in the step ST112 shown in FIG. 10. In the step ST113, it is verified that setting for isochronous transaction succeeds. The process is terminated completely.

Operation for setting isochronous transaction in the example of arrangement shown in FIG. 3B will be described below.

First, the owner 1 starts operation for setting isochronous transaction according to the flowchart shown in FIG. 10. In this case, as the owner 1 and the talker 2 respectively exist on the different buses 4A and 4B, TOIP is set to 0 in the step ST102.

In the step ST110, the owner 1 sends the command information to the portal 60A, as a target node, of the bridge 6D on a path toward the local bus 4B on which the talker 2 exists. The owner 1 requests the portal 60A of the bridge 6D to set the isochronous transaction therefor.

The portal 60A of the bridge 6D received the request for setting isochronous transaction starts operation for setting isochronous transaction according to the flowchart shown in FIG. 11. In this case, as the portal 60A of the bridge 6D is not on a path from the talker 2 to the listener 3, OIP[cid] is 0. Therefore, the process proceeds to the step ST306 according to the judgment in the step ST304. The portal 60A requests the other portal 60B of the bridge 6D to set the isochronous transaction therefor without setting for the above portal 60A.

Said portal 60B of the bridge 6D received the request for setting isochronous transaction starts operation for setting isochronous transaction according to the flowchart shown in FIG. 12. In this case, as the talker 2 exists on the local bus 4B, TOIP[cid] is set to 1 in the step ST205. The isochronous transaction for the local bus 4B is set in the step ST206.

As OIP[cid] is 0, the process proceeds to the step ST210 according to the judgment in the step ST208 and no setting for the portal 60B of the bridge 6D is made.

As the listener 3 does not exist on the local bus 4B, the process proceeds to the step ST211 according to the judgment in the step ST210.

In the step ST213, said portal 60B of the bridge 6D sends the command information to the other portal 60A, as a target node, of the bridge 6E on a path toward the local bus 4C on which the listener 3 exists. The portal 60B of the bridge 6D requests the portal 60A of the bridge 6E to set the isochronous transaction therefor.

The portal 60A of the bridge 6E received the request for setting isochronous transaction starts operation for setting isochronous transaction according to the flowchart shown in FIG. 11. In this case, as the portal 60A of the bridge 6E exists on a path from the talker 2 to the listener 3, OIP [cid] is 1. Therefore, the process proceeds to the step ST305 according to the judgment in the step ST304. In the step ST305, the above portal 60A of the bridge 6E is set. In the step ST306, the portal 60A of the bridge 6E requests the other portal 60B of the bridge 6E to set the isochronous transaction therefor.

The portal 60B of the bridge 6E receives the request for setting isochronous transaction of the bridge 6E starts operation for setting isochronous transaction according to the flowchart shown in FIG. 12. In this case, as the portal 60B of the bridge 6E exists on a path from the talker 2 to the listener 3, OIP [cid] is 1. Therefore, the process proceeds to the step ST205 according to the judgment in the step ST201.

In the step ST205, TOIP [cid] is set to 1. In the step ST206, the isochronous transaction for the local bus 4C is set.

As OIP [cid] is 1, the process proceeds to the step ST209 according to the judgment in the step ST208. In the step ST209, the above portal 60B of the bridge 6E is set.

As the listener 3 exists on the local bus 4C, the process proceeds to the step ST216 according to the judgment in the step ST210. In the step ST216, the above portal 60B of the bridge 6E sends a complete response showing that setting for isochronous transaction succeeds to the other portal 60A of the bridge 6E. The process as shown in FIG. 12 is terminated.

When the portal 60A of the bridge 6E receives the complete response, the process proceeds to the step ST309 according to the judgment in the step ST308 shown in FIG. 11. In the step ST309, the portal 60A of the bridge 6E sends a complete response to the other portal 60B of the bridge 6D, which is an initiator. The process as shown in FIG. 11 is terminated.

When said portal 60B of the bridge 6D receives the complete response, the process proceeds to the step ST216 according to the judgment in the step ST215 shown in FIG. 12. Said portal 60B of the bridge 6D sends a complete response to the portal 60A of the bridge 6D. The process as shown in FIG. 12 is terminated.

When the portal 60A of the bridge 6D receives the complete response, the process proceeds to the step ST309 according to the judgment in the step ST308 shown in FIG. 11. In the step ST309, the portal 60A of the bridge 6D sends a complete response to the owner 1, which is an initiator. The process as shown in FIG. 11 is terminated.

When the owner 1 receives the complete response, the process proceeds to the step ST113 according to the judgment in the step ST112 shown in FIG. 10. In the step ST113, it is verified that setting for isochronous transaction succeeds. The process is terminated completely.

Operation for setting isochronous transaction in the example of arrangement shown in FIG. 4A will be described below.

First, the owner 1 starts operation for setting isochronous transaction according to the flowchart shown in FIG. 10. In this case, as the owner 1 and the talker 2 respectively exist on the different buses 4A and 4C, TOIP is set to 0 in the step ST102. The owner 1 sends the command information to the portal 60A, as a target node, of the bridge 6D on a path toward the local bus 4C on which the talker 2 exists in the step ST110. The owner 1 requests the portal 60A of the bridge 6D to set the isochronous transaction therefor.

The portal 60A of the bridge 6D received the request for setting isochronous transaction starts operation for setting isochronous transaction according to the flowchart shown in FIG. 11. In this case, as the portal 60A of the bridge 6D does not exist on a path from the talker 2 to the listener 3, OIP [cid] is 0. Therefore, the process proceeds to the step ST306 according to the judgment in the step ST304. In the step ST306, the portal 60A of the bridge 6D requests the other portal 60B of the bridge 6D to set the isochronous transaction therefor without setting for the above portal 60A.

When said portal 60B of the bridge 6D received the request for setting isochronous transaction starts operation for setting isochronous transaction according to the flowchart shown in FIG. 12. In this case, as OIP [cid] is 0 and the talker 2 does not exist on the local bus 4B, the process proceeds to the step ST203 according to the judgment in the step ST202.

In the step ST203, TOIP [cid] is set to 0, and, in the step ST213, said other portal 60B of the bridge 6D sends the command information to the portal 60A, as a target node, of the bridge 6E on a path toward the local bus 4C on which the talker 2 exists. Said portal 60B of the bridge 6D requests the portal 60A of the bridge 6E to set the isochronous transaction therefor (a1).

The portal 60A of the bridge 6E received the request (a1) for setting isochronous transaction starts operation for setting isochronous transaction according to the flowchart shown in FIG. 11. In this case, as OIP [cid] is 0, the process proceeds to the step ST306 according to the judgment in the step ST304. In the step ST306, the portal 60A of the bridge 6E requests the other portal 60B of the bridge 6E to set the isochronous transaction therefor (a2) without setting for the portal 60A of the bridge 6E.

The portal 60B of the bridge 6E received the request (a2) for setting isochronous transaction starts operation for setting isochronous transaction according to the flowchart shown in FIG. 12. In this case, as the talker 2 exists on the local bus 4C, TOIP [cid] is set to 1 in the step ST205. The isochronous transaction for the local bus 4C is set in the step ST206.

As OIP [cid] is 0, the process proceeds to the step ST210 according to the judgment in the step ST208 and no setting for the above portal is made.

As the listener 3 does not exist on the local bus 4C, the process proceeds to the step ST211 according to the judgment in the step ST210.

The node ID of the portal 60B of the bridge 6E on a path toward the local bus 4B on which the listener 3 exists is set as target node ID in the step ST212. That is, in this case, the portal 60B itself of the bridge 6E functions as a target node and the portal 60B of the bridge 6E requests the portal 60B itself to set the isochronous transaction therefor (b1) in the step ST213.

The portal 60B of the bridge 6E received the request (b1) for setting isochronous transaction starts operation for setting isochronous transaction according to the flowchart shown in FIG. 11. In this case, as the portal 60B of the bridge 6E exists on a path from the talker 2 to the listener 3, OIP [cid] is 1. Therefore, the process proceeds to the step ST305 according to the judgment in the step ST304. In the step ST305, the above portal 60B of the bridge 6E is set and afterward, the portal 60B of the bridge 6E requests other portal 60A of the bridge 6E to set the isochronous transaction therefor (b2) in the step ST306.

Said portal 60A of the bridge 6E received the request (b2) for setting isochronous transaction starts operation for setting isochronous transaction according to the flowchart shown in FIG. 12. In this case, as the portal 60A of the bridge 6E exists on a path from the talker 2 to the listener 3, OIP [cid] is 1. Therefore, the process proceeds to the step ST205 according to the judgment in the step ST201. In the step ST205, TOIP [cid] is set to 1. The isochronous transaction for the local bus 4B is set in the step ST206. As OIP [cid] is 1, the process proceeds to the step ST209 according to the judgment in the step ST208. In the step ST209, the above portal 60A of the bridge 6E is set.

As the listener 3 exists on the local bus 4B, the process proceeds to the step ST216 according to the judgment in the step ST210. The portal 60A of the bridge 6E sends a complete response showing that setting for isochronous transaction succeeds to the other portal 60B of the bridge 6E. The processing related to the request (b2) is terminated.

When the portal 60B of the bridge 6E receives the complete response, the process proceeds to the step ST309 according to the judgment in the step ST308 shown in FIG. 11. In the step ST309, the portal 60B of the bridges 6E sends a complete response to the portal 60B itself, which is an initiator. The process related to the request (b1) is terminated.

When the portal 60B of the bridge 6E receives the complete response, the process proceeds to the step ST216 according to the judgment in the step ST215 shown in FIG. 12. In the step SR216, the portal 60B of the bridge 6E sends a complete response to the other portal 60A of the bridge 6E. The process related to the request (a2) is terminated.

When the portal 60A of the bridge 6E receives the complete response, the process proceeds to the step ST309 according to the judgment in the step ST308 shown in FIG. 11. In the step ST309, the portal 6A of the bridge 6E sends a complete response to the portal 60B of the bridge 6D, which is an initiator. The process related to the request (a1) is terminated.

When the portal 60B of the bridge 6D receives the complete response, the process proceeds to the step ST216 according to the judgment in the step ST215 shown in FIG. 12. In the step ST216, the portal 60B of the bridge 6D sends a complete response to the other portal 60A of the bridge 6D.

When the portal 60A of the bridge 6D receives the complete response, the process proceeds to the step ST309 according to the judgment in the step ST308 shown in FIG. 11. In the step ST309, the portal 60A of the bridge 6D sends a complete response to the owner 1, which is an initiator.

When the owner 1 receives the complete response, the process proceeds to the step ST113 according to the judgment in the step ST112 shown in FIG. 10. In the step ST 113, it is verified that setting for isochronous transaction succeeds. The process is terminated completely.

Operation for setting isochronous transaction in the example of arrangement shown in FIG. 4B will be described below.

First, the owner 1 starts operation for setting isochronous transaction according to the flowchart shown in FIG. 10. In this case, as the owner 1 and the talker 2 respectively exist on the different buses 4B and 4A, TOIP is set to 0 in the step ST102. The owner 1 sends the command information to the portal 60B, as a target node, of the bridge 6D on a path toward the local bus 4A on which the talker 2 exists in the step ST110. The owner 1 requests the portal 60B of the bridge 6D to set the isochronous transaction therefor (a1).

The portal 60B of the bridge 6D received the request (a1) for setting isochronous transaction starts operation for setting isochronous transaction according to the flowchart shown in FIG. 11. In this case, as OIP [cid] is 0, the process proceeds to the step ST306 according to the judgment in the step ST304. The portal 60B of the bridge 6D requests the other portal 60A of the bridge 6D to set the isochronous transaction therefor (a2) without setting for the above portal 60B of he bridge 6D.

The portal 60A of the bridge 6D received the request (a2) for setting isochronous transaction of the bridge 6D starts operation for setting isochronous transaction according to the flowchart shown in FIG. 12. In this case, as the talker 2 exists on the local bus 4A, the process proceeds to the step ST205 according to the judgment in the step ST202.

In the step ST205, TOIP [cid] is set to 1. In the step ST206, the isochronous transaction for the local bus 4A is set.

As OIP [cid] is 0, the process proceeds to the step ST210 according to the judgment in the step ST208 without setting the portal 60A of the bridge 6D.

As the listener 3 does not exist on the local bus 4A, the process proceeds to the step ST211 according to the judgment in the step ST210 and the node ID of the portal 60A of the bridge 6D on a path toward the local bus 4C on which the listener 3 exists is set as target node ID in the step ST212. That is, in this case, the portal 60A itself of the bridge 6D functions as a target node and requests portal 60A itself to set the isochronous transaction therefor (b1) the in the step ST213.

The portal 60A of the bridge 6D received the request (b1) for setting isochronous transaction starts operation for setting isochronous transaction according to the flowchart shown in FIG. 11. In this case, as the portal 60A of the bridge 6D exists on a path from the talker 2 to the listener 3, OIP [cid] is 1. Therefore, the process proceeds to the step ST305 according to the judgment in the step ST304. In the step ST305, the above portal 60A of the bridge 6D is set and afterward, the portal 60A sends a request (b2) for setting isochronous transaction to the other portal 60B of the bridge 6D in the step ST306.

The portal 60B of the bridge 6D received the request (b2) for setting isochronous transaction starts operation for setting isochronous transaction according to the flowchart shown in FIG. 12. In this case, as the portal 60B of the bridge 6D exists on a path from the talker 2 to the listener 3, OIP [cid] is 1. Therefore, the process proceeds to the step ST205 according to the judgment in the step ST201. In the step ST205, TOIP [cid] is set to 1. In the step ST206, the isochronous transaction for the local bus 4B is set.

As OIP [cid] is 1, the process proceeds to the step ST209 according to the judgment in the step ST208. In the step ST209, the above portal 60B of the bridge 6D is set.

As the listener 3 does not exist on the local bus 4B, the process proceeds to the step ST211 according to the judgment in the step ST210. In the step ST213, the portal 60B of the bridge 6D sends the command information to the portal 60A, as a target node, of the bridge 6E on a path toward the local bus 4C on which the listener 3 exists. The portal 60B of the bridge 6D requests the portal 60A of the bridge 6E to set the isochronous transaction therefor.

The portal 60A of the bridge 6E received the request for setting isochronous transaction starts operation for setting isochronous transaction according to the flowchart shown in FIG. 11. In this case, as the portal 60A of the bridge 6E exists on a path from the talker 2 to the listener 3, OIP [cid] is 1. Therefore, the process proceeds to the step ST305 according to the judgment in the step ST304. In the step ST305, the above portal 60A of the bridge 6E is set.

In the step ST306, the portal 60A of the bridge 6E requests the other portal 60B of the bridge 6E to set the isochronous transaction therefor.

The portal 60B of the bridge 6E received the request for setting isochronous transaction starts operation for setting isochronous transaction according to the flowchart shown in FIG. 12. In this case, as the portal 60B of the bridge 6E exists on a path from the talker 2 to the listener 3, OIP [cid] is 1. Therefore, the process proceeds to the step ST205 according to the judgment in the step ST201.

In the step ST205, TOIP [cid] is set to 1. In the step ST206, the isochronous transaction for the local bus 4C is set.

As OIP [cid] is 1, the process proceeds to the step ST209 according to the judgment in the step ST208. In the step ST209, the above portal 60B of the bridge 6E is set.

As the listener 3 exists on the local bus 4C, the process proceeds to the step ST216 according to the judgment in the step ST210. In the step ST 216, the portal 60B of the bridge 6E sends a complete response showing that setting for isochronous transaction succeeds to the other portal 60A of the bridge 6E.

When the portal 60A of the bridge 6E receives the complete response, the process proceeds to the step ST309 according to the judgment in the step ST308 shown in FIG. 11. In the step SR309, the portal 60A of the bridge 6E sends a complete response to the portal 60B of the bridge 6D, which is an initiator.

When the portal 60B of the bridge 6D receives the complete response, the process proceeds to the step ST216 according to the judgment in the step ST215 shown in FIG. 12. In the step ST216, the portal 60B of the bridge 6D sends a complete response to the other portal 60A of the bridge 6D. The process related to the request (b2) is terminated.

When the portal 60A of the bridge 6D receives the complete response, the process proceeds to the step ST309 according to the judgment in the step ST308 shown in FIG. 11. In the step ST309, the portal 60A of the bridge 6D sends a complete response to the portal 60A itself, which is an initiator. The process related to the request (b1) is terminated.

When the portal 60A of the bridge 6D receives the complete response, the process proceeds to the step ST216 according to the judgment in the step ST215 shown in FIG. 12. In the step ST216, the portal 60A of the bridge 6D sends a complete response to the other portal 60B of the bridge 6D. The process related to the request (a2) is terminated.

When the portal 60B of the bridge 6D receives the complete response, the process proceeds to the step ST309 according to the judgment in the step ST308 shown in FIG. 11. In the step ST309, the portal 60B of the bridge 6D sends a complete response to the owner 1, which is an initiator. The process related to the request (a1) is terminated.

When the owner 1 receives the complete response, the process proceeds to the step ST113 according to the judgment in the step ST112 shown in FIG. 10. In the step ST113, it is verified that setting for isochronous transaction succeeds. The process is terminated completely.

As described above, in this embodiment, the owner 1 executes operation according to the flowchart shown in FIG. 10 and the portals 60A and 60B constituting the bridge 6 suitably execute operation according to the flowchart shown in FIG. 11 or 12. Therefore, a request for setting isochronous transaction is sequentially propagated on a path from the talker 2 to the listener 3 and the setting of isochronous transaction for the buses and the bridges on a path from the talker 2 to the listener 3 is made. Hereby, even if the owner 1, the talker 2 and the listener 3 do not exist on the same bus, the setting for isochronous transaction is satisfactorily made.

In the above embodiment, although the request for setting isochronous transaction is sequentially propagated on a path from the talker 2 to the listener 3, conversely a request for setting isochronous transaction may be also sequentially propagated on a path from the listener 3 to the talker 2. Only substitution of the talker and the listener for each other in the flowcharts shown in FIGS. 10 to 12 allows the bus network to realize the above. When the talker 2 exists on the side of the owner 1, a path from the talker 2 to the listener 3 may be also selected. When the listener 3 exists on the side of the owner 1, a path from the listener 3 to the talker 2 may be also selected.

[Isochronous transaction setting releasing method]

Next, a method of releasing the setting of isochronous transaction in the above bus network will be described.

Referring to a flowchart shown in FIG. 13, the operation for releasing the setting of isochronous transaction of the owner 1 will be described below.

The owner 1 executes operation for releasing the setting of isochronous transaction using talker bus ID, talker physical ID, listener bus ID, listener physical ID, isochronous transaction bandwidth and target node ID. The above information is used in setting and is stored in setting. The owner 1 executes steps in the flowchart shown in FIG. 13 when it releases the setting of isochronous transaction.

In a step ST401, it is judged whether local bus ID and talker bus ID are equal or not. When they are different, the process proceeds to a step ST402. When they are equal, the process proceeds to a step ST404.

If local bus ID and talker bus ID are equal (see FIGS. 2A and 2C), the setting of isochronous transaction for the corresponding local bus has been made (refer to the steps ST101 and ST105 shown in FIG. 10).

In the step ST404, the setting of isochronous transaction for the local bus is released. Although the detailed description is omitted, the above releasing processing is similar to the processing described in relation to the step ST115 in FIG. 10.

In a step ST405, it is judged whether local bus ID and listener bus ID are equal or not. When they are different, the process proceeds to the step ST402. When they are equal, the process proceeds to a step ST406.

In the step ST402, the owner 1 functions as an initiator and requests a target node to release the setting of isochronous transaction. The target node is connected to the same bus as the owner 1 and is a portal of a bridge on a path toward the local bus on which the talker 2 or the listener 3 exists.

Next, in a step ST403, the owner 1 receives a reset response from the target node and the process proceeds to the step ST406.

In the step ST406, it is verified that the setting of isochronous transaction is released and the process is terminated. The above reset response means a response showing that the release of the setting of isochronous transaction is completed.

Referring to a flowchart shown in FIG. 14, the operation for releasing the setting of isochronous transaction of a portal which receives a request for releasing the setting of isochronous transaction from the owner 1 or a portal constituting another bridge 6 and others will be described.

The portal executes operation for releasing the setting of isochronous transaction using OIP [cid], cid and initiator node ID. The above information is used in setting and is stored in setting. The portal executes steps in the flowchart shown in FIG. 14 when it releases the setting of isochronous transaction.

In a step ST601, it is judged whether OIP [cid] is 1 or not. When OIP [cid] is 1, the process proceeds to a step ST602. When OIP [cid] is 0, the process proceeds to a step ST603.

When OPI [cid] is 1, the setting of the portal has been made (refer to the steps ST304 and ST305 shown in FIG. 11). In the step ST602, the portal releases the setting thereof. Although the detailed description is omitted, the above releasing processing is similar to that described in relation to the step ST311 shown in FIG. 11.

After the portal releases the setting of the portal in the step ST602, the process proceeds to the step ST603.

In the step ST603, the portal sends "cid" to the other portal and requests said other portal to release the setting of isochronous transaction therefor.

Next, in a step ST604, the portal receives a reset response from said other portal. In a step ST605, the portal sends a reset response to an initiator.

Referring to a flowchart shown in FIG. 15, the operation for releasing the setting of synchronous communication of a portal which receives a request for releasing the setting of isochronous transaction from the other portal constituting the same bridge will be described.

The portal executes operation for releasing the setting of isochronous transaction using talker bus ID, talker physical ID, listener bus ID, listener physical ID, isochronous transaction bandwidth, target node ID, OIP [cid], TOIP [cid] and cid. The above information is used in setting and is stored in setting. The portal executes steps in the flowchart shown in FIG. 15 when it releases the setting of isochronous transaction.

In step ST501, it is judged whether TOIP [cid] is 1 or not. When TOIP [cid] is 1, the process proceeds to a step ST506. When TOIP [cid] is 0, the process proceeds to a step ST503.

When TOIP [cid] is 1, the setting of isochronous transaction for the local bus has been made (refer to the steps ST205 and ST206 shown in FIG. 12). In the step ST 506, the above portal releases the setting of isochronous transaction for a local bus. Although the detailed description is omitted, the above releasing processing is similar to that described in relation to the step ST115 shown in FIG. 10.

In a step ST507, it is judged whether OIP [cid] is 1 or not. When OIP [cid] is 1, the process proceeds to a step ST508. When OIP [cid] is 0, the process proceeds to a step ST509.

When OIP [cid] is 1, the setting of the portal has been made (refer to the steps ST208 and ST209 shown in FIG. 12).

In the step ST508, the portal releases the setting thereof. Although the detailed description is omitted, the above releasing processing is similar to that described in relation to the step ST311 shown in FIG. 11.

After the portal releases the setting for the portal in the step ST508, the process proceeds to the step ST509.

In the step ST509, it is judged whether local bus ID and listener bus ID are equal or not. When they are different, the process proceeds to the step ST503. When they are equal, the process proceeds to a step ST505.

In the step ST503, the portal functions as an initiator and requests a target node to release the setting of isochronous transaction. The target node is connected to the same bus as the portal itself and is a portal of a bridge on a path toward the local bus on which the talker 2 or the listener 3 exists.

In a step ST504, the portal receives a reset response from the target node. In the step ST505, the portal sends a reset response to the other portal. The process is terminated.

Next, operation for releasing the setting of isochronous transaction in case the owner 1, the talker 2 and the listener 3 are arranged as shown in FIGS. 2A to 2C, 3A, 3B, 4A and 4B will be described briefly.

Operation for releasing the setting of isochronous transaction in the example of arrangement shown in FIG. 2A will be described below.

Figure 13:
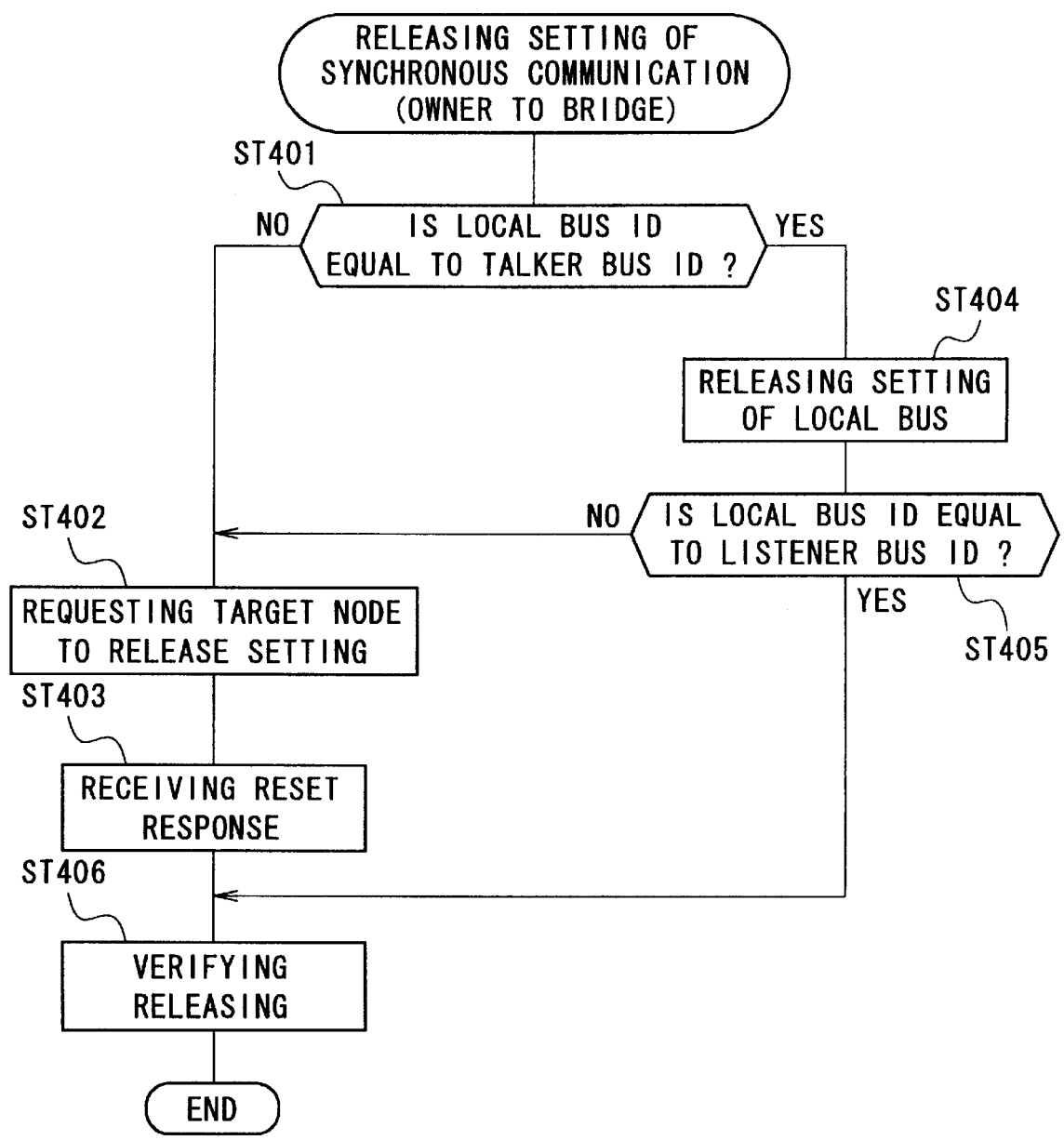
FIG. 13 is a flowchart showing an operation for releasing the setting of synchronous communication form the owner to the bridge.

First, the owner 1 starts operation for releasing the setting of isochronous transaction according to the flowchart shown in FIG. 13. In this case, as the owner 1 and the talker 2 exist on the same bus 4, the process proceeds to the step ST404 according to the judgment in the step ST401. In the step ST404, the setting of isochronous transaction for the local bus 4 is released.

Also, as the owner 1 and the listener 3 exist on the same bus 4, the process proceeds to the step ST406 according to the judgment in the step ST405. In the step ST406, it is verified that the setting of isochronous transaction is released. The process is terminated.

As described above, when the owner 1, the talker 2 and the listener 3 are located in positional relationship shown in FIG. 2A, operation for releasing the setting of isochronous transaction is finished by only operation for releasing the setting of isochronous transaction for the owner 1.

Operation for releasing the setting of isochronous transaction in example of arrangement shown in FIG. 2B will be described below.

First, the owner 1 starts operation for releasing the setting of isochronous transaction according to the flowchart shown in FIG. 13. In this case, as the owner 1 and the talker 2 respectively exist on the different buses 4A and 4B, the process proceeds to the step ST402 according to the judgment in the step ST401. In the step ST402, the owner 1 requests the portal 60A, as a target node, of the bridge 6 on a path toward the local bus 4B on which the talker 2 exists to release the setting of isochronous transactions thereof.

Figure 14:
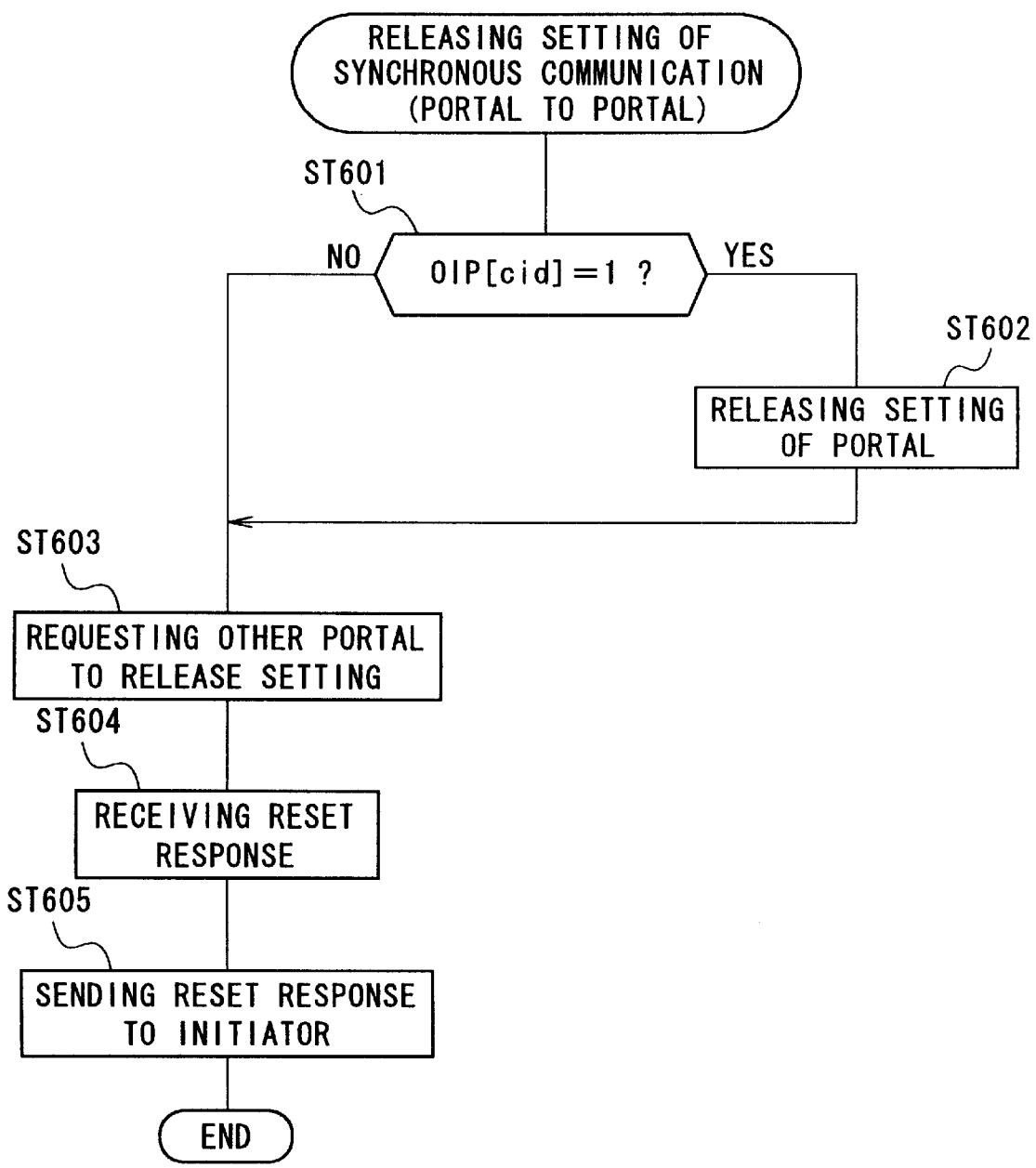
FIG. 14 is a flowchart showing an operation for releasing the setting of synchronous communication from the portal to other portal.

The portal 60A received the request for releasing the setting of isochronous transaction starts operation for releasing the setting of isochronous transaction according to the flowchart shown in FIG. 14.

Since the portal 60A does not exist on a path from the talker 2 to the listener 3 and the portal is not set, OIP [cid] is 0. Therefore, the process proceeds to the step ST603 according to the judgment in the step ST601. In the step ST603, the portal 60A requests the other portal 60B to release the setting of isochronous transaction thereof.

Figure 15:
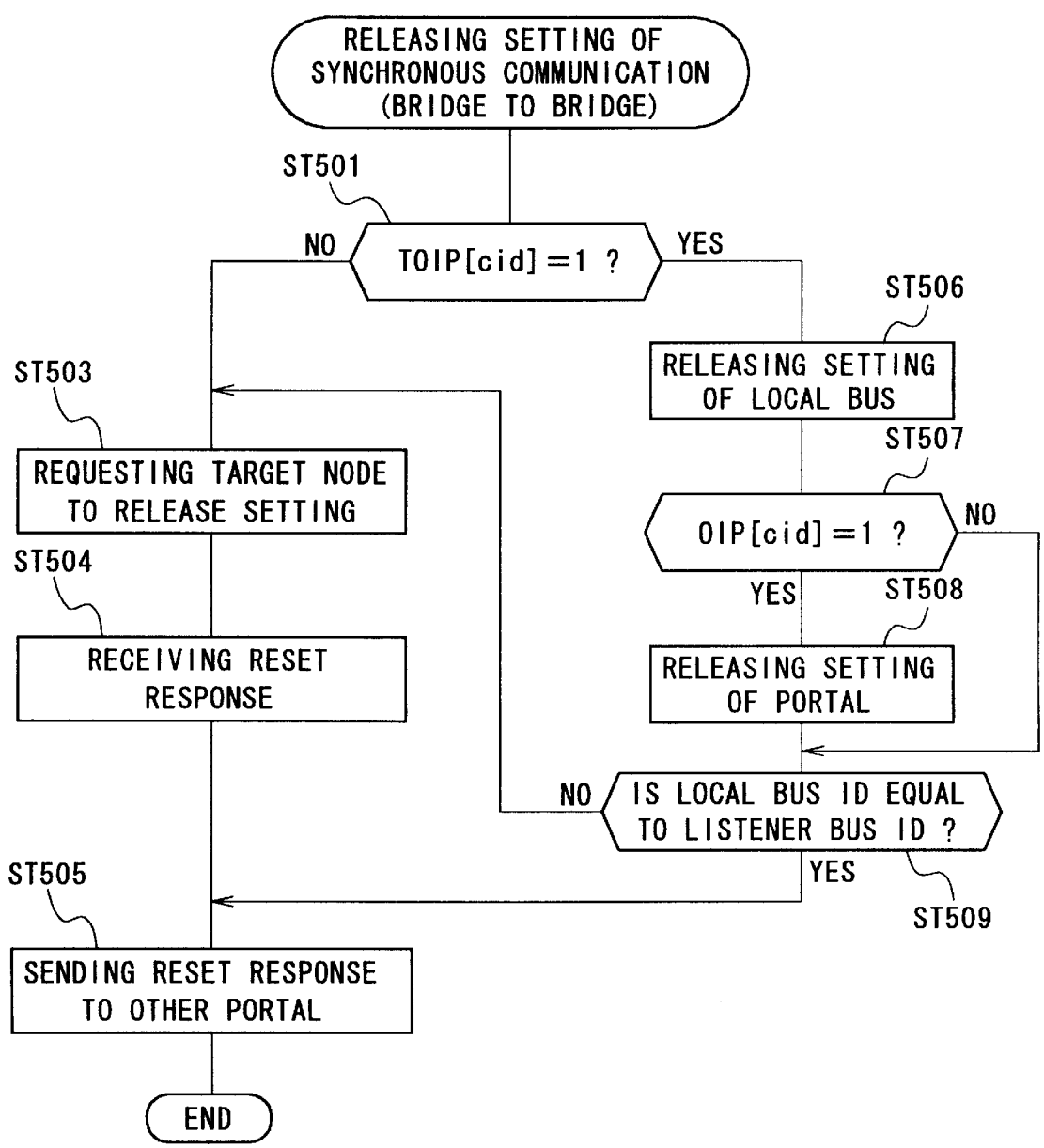
FIG. 15 is a flowchart showing an operation for releasing the setting of isochronous transaction from the bridge to other bridge.

The portal 60B received the request for releasing the setting of isochronous transaction starts operation for releasing the setting of isochronous transaction according to the flowchart shown in FIG. 15.

Since the talker 2 exists on the local bus 4B and the setting of isochronous transaction for the local bus 4B is made, TOIP [cid] is 1. Therefore, the process proceeds to the step ST506 according to the judgment in the step ST501. In the step ST506, the setting of isochronous transaction for the local bus 4B is released.

Also, since OIP [cid] is 0 and the portal is not set, the process proceeds to the step ST509 according to the judgment in the step ST507.

Also, as the listener 3 exists on the local bus 4B, the process proceeds to the step ST505 according to the judgment in the step ST509. In the step ST505, the portal 60B sends a reset response to the other portal 60A.

The portal 60A received the reset response sends a reset response to the owner 1, which is an initiator, in the step ST605 shown in FIG. 14 and terminates processing.

In the step ST406 shown in FIG. 13, the owner 1 received the reset response verifies that the setting of isochronous transaction is released and terminates the processing.

In FIG. 2B, the buses 4A and 4B are adjacent. However, if one or plural buses 4 exist between these buses 4A and 4B, the above operation in the flowcharts shown in FIGS. 14 and 15 is sequentially alternately executed.

This is also similar in relation to the following operation for releasing the setting of isochronous transaction in the examples of arrangement shown in FIGS. 2C, 3A, 3B, 4A and 4B.

Operation for releasing the setting of isochronous transaction in the example of arrangement shown in FIG. 2C will be described below.

First, the owner 1 starts operation for releasing the setting of isochronous transaction according to the flowchart shown in FIG. 13. In this case, as the owner 1 and the talker 2 exist on the same bus 4A, the process proceeds to the step ST404 according to the judgment in the step ST401. In the step ST404, the setting of isochronous transaction for the local bus 4A is released.

As the owner 1 and the listener 3 respectively exist on the different buses 4A and 4B, the process proceeds to the step ST402 according to the judgment in the step ST405.

In the step ST402, the owner 1 requests the portal 60A, as a target node, of the bridge 6 on a path toward the local bus 4B on which the listener 3 exists, to release the setting of isochronous transaction thereof.

The portal 60A received the request for releasing the setting of isochronous transaction starts operation for releasing the setting of isochronous transaction according to the flowchart shown in FIG. 14. In this case, since the portal 60A exists on a path from the talker 2 to the listener 3 and the portal 60A is set, OIP [cid] is 1. Therefore, the process proceeds to the step ST602 according to the judgment in the step ST601.

In the step ST602, the setting for the portal is released.

In the step ST603, the portal 60A requests the other portal 60B to release the setting of isochronous transaction thereof.

The portal 60B received the request for releasing the setting of isochronous transaction starts operation for releasing the setting of isochronous transaction according to the flowchart shown in FIG. 15. In this case, as the setting of isochronous transaction for the local bus 4B has been made, TOIP [cid] is 1. Therefore, the process proceeds to the step ST506 according to the judgment in the step ST501.

In the step ST506, the setting of isochronous transaction for the local bus 4B is released.

Also, since the portal 60B exists on a path from the talker 2 to the listener 3 and the portal 60B is set, OIP [cid] is 1. Therefore, the process proceeds to the step ST508 according to the judgment in the step ST507. In the step ST508, the setting for the portal 60B is released.

Also, as the listener 3 exists on the local bus 4B, the process proceeds to the step ST505 according to the judgment in the step ST509. In the step ST505, the portal 60B sends a reset response to the other portal 60A.

Next, the portal 60A received the reset response sends a reset response to the owner 1, which is in an initiator, in the step ST605 shown in FIG. 14.

In the step ST406 shown in FIG. 13, the owner 1 received the reset response verifies that the setting of isochronous transaction is released. The process is terminated completely.

Operation for releasing the setting of isochronous transaction in example of arrangement shown in FIG. 3A will be described below.

First, the owner 1 starts operation for releasing the setting of isochronous transaction according to the flowchart shown in FIG. 13. In this case, as the owner 1 and the talker 2 respectively exist on the different buses 4A and 4B, the process proceeds to the step ST402 according to the judgment in the step ST401. In the step ST402, the owner 1 requests the portal 60A, as a target node, of the bridge 6 on a path toward the local bus 4B on which the talker 2 exists, to release the setting of isochronous transaction thereof (c1).

The portal 60A received the request (c1) for releasing the setting of isochronous transaction starts operation for releasing the setting of isochronous transaction according to the flowchart shown in FIG. 14. In this case, as OIP [cid] is 0, the process proceeds to the step ST603 according to the judgment in the step ST601. In the step ST603, the portal 60A of the bridge 6 requests the other portal 60B to release the setting of isochronous transaction thereof (c2).

The portal 60B received the request (c2) for releasing the setting of isochronous transaction starts operation for releasing the setting of isochronous transaction according to the flowchart shown in FIG. 15. In this case, since the talker 2 exists on the local bus 4B and the isochronous transaction for the local bus 4B is set, TOIP [cid] is 1. Therefore, the process proceeds to the step ST506 according to the judgment in the step ST501. In the step ST506, the setting of isochronous transaction for the local bus 4B is released.

Also, as OIP [cid] is 0, the process proceeds to the step ST509 according to the judgment in the step ST507.

Also, as the listener 3 does not exist on the local bus 4B, the process proceeds to the step ST503 according to the judgment in the step ST509.

In the step ST503, the portal 60B requests the portal 60B itself on a path toward the local bus 4A on which the listener 3 exists, to release the setting of isochronous transaction thereof (d1).

The portal 60B received the request (d1) of releasing the setting of isochronous transaction starts operation for releasing the setting of isochronous transaction according to the flowchart shown in FIG. 14. In this case, since the portal 60B exists on a path from the talker 2 to the listener 3 and the portal 60B is set, OIP [cid] is 1. Therefore, the process proceeds to the step ST602 according to the judgment in the step ST601.

In the step ST602, the setting for the portal 60B is released.

In the step ST603, the portal 60B requests the other portal 60A to release the setting of isochronous transaction thereof (d2).

The portal 60A received the request (d2) for releasing the setting of isochronous transaction starts operation for releasing the setting of isochronous transaction according to the flowchart shown in FIG. 15. In this case, as the setting of isochronous transaction for the local bus 4A has been made, TOIP [cid] is 1. Therefore, the process proceeds to the step ST506 according to the judgment in the step ST501. In the step ST506, the setting of isochronous transaction for the local bus 4A is released.

Also, since the portal 60A exits on a path from the talker 2 to the listener 3 and the portal 60A is set, OIP [cid] is 1. Therefore, the process proceeds to the step ST508 according to the judgment in the step ST507. In the step ST508, the setting for the portal 60A is released.

Also, as the listener 3 exists on the local bus 4A, the process proceeds to the step ST505 according to the judgment in the step ST509. In the step ST505, the portal 60A sends a reset response to the other portal 60B. The process related to the request (d2) is terminated.

In the step ST605 shown in FIG. 14, the portal 60B received the reset response sends a reset response to the portal 60B itself, which is an initiator. The process related to the request (d1) is terminated.

In the step ST505 shown in FIG. 15, the portal 60B received the reset response sends a reset response to the other portal 60A. The process related to the request (c2) is terminated.

In the step ST605 shown in FIG. 14, the portal 60A received the reset response sends a reset response to the owner 1, which is an initiator. The process related to the request (c1) is terminated.

In the step ST406 shown in FIG. 13, the owner 1 received the reset response verifies that the setting of isochronous transaction is released. The process is terminated completely.

Operation for releasing the setting of isochronous transaction in the example of arrangement shown in FIG. 3B will be described below.

First, the owner 1 starts operation for releasing the setting of isochronous transaction according to the flowchart shown in FIG. 13. In this case, as the owner 1 and the talker 2 respectively exist on the different buses 4A and 4B, the process proceeds to the step ST402 according to the judgment in the step ST401. In the step ST402, the owner 1 requests the portal 60A, as a target node, of the bridge 6D on a path toward the local bus 4B on which the talker 2 exists, to release the setting of isochronous transaction thereof.

The portal 60A of the bridge 6D received the request for releasing the setting of isochronous transaction of the bridge 6D starts operation for releasing the setting of isochronous transaction according to the flowchart shown in FIG. 14. In this case, since the portal 60A of the bridge 6D is not on a path from the talker 2 to the listener 3 and the portal is not set, OIP [cid] is 0. Therefore, the process proceeds to the step ST603 according to the judgment in the step ST601.

In the step ST603, the portal 60A of the bridge 6D requests the other portal 60B of the bridge 6D to release the setting of isochronous transaction thereof.

The portal 60B of the bridge 6D received the request for releasing the setting of isochronous transaction of the bridge 6D starts operation for releasing the setting of isochronous transaction according to the flowchart shown in FIG. 15. In this case, since the talker 2 exists on the local bus 4B and the isochronous transaction for the local bus 4B is set, TOIP [cid] is 1. Therefore, the process proceeds to the step ST506 according to the judgment in the step ST501. In the step ST506, the setting of isochronous transaction for the local bus 4B is released. Here, the portal 60B of the bridge 6D does not exist on a path from the talker 2 to the listener 3 and is not set.

Also, as the listener 3 does not exist on the local bus 4B, the process proceeds to the step ST503 according to the judgment in the step ST509.

In the step ST503, the portal 60B of the bridge 6D requests the portal 60A, as a target node, of the bridge 6E on a path toward the local bus 4C on which the listener 3 exits, to release the setting of isochronous transaction hereof.

The portal 60A of the bridge 6E received the request for releasing the setting of isochronous transaction starts operation for releasing the setting of isochronous transaction according to the flowchart shown in FIG. 14. In this case, since the portal 60A of the bridge 6E exists on a path from the talker 2 to the listener 3 and the portal 60A of the bridge 6E is set, OIP [cid] is 1. Therefore, the process proceeds to the step ST602 according to the judgment in the step ST601. In the step ST602, the setting for the portal 60A of the bridge 6E is released.

In the step ST603, the portal 60A of the bridge 6E requests the other portal 60B of the bridge 6E to release the setting of isochronous transaction thereof.

The portal 60B of the bridge 6E received the request for releasing the setting of isochronous transaction starts operation for releasing the setting of isochronous transaction according to the flowchart shown in FIG. 15. In this case, as the setting of isochronous transaction for the local bus 4C has been made, TOIP [cid] is 1. Therefore, the process proceeds to the step ST506 according to the judgment in the step ST501. In the step ST506, the setting of isochronous transaction for the local bus 4C is released.

Also, since the portal 60B of the bridge 6E exists on a path from the talker 2 to the listener 3 and the portal 60B of the bridge 6E is set, OIP [cid] is 1. Therefore, the process proceeds to the step ST508 according to the judgment in the step ST507. In the step ST508, the setting for the portal 60B of the bridge 6E is released.

Also, as the listener 3 exists on the local bus 4C, the process proceeds to the step ST505 according to the judgment in the step ST509. In the step ST505, the portal 60B of the bridge 6E sends a reset response to the other portal 60A of the bridge 6E.

In the step ST605 shown in FIG. 14, the portal 60A of the bridge 6E received the resent response sends a reset response to the portal 60B of the bridge 6D, which is an initiator.

The portal 60B of the bridge 6D received the reset response sends a reset response to the other portal 60A of the bridge 6D in the step ST505 shown in FIG. 15.

Next, the portal 60A of the bridge 6D received the reset response of the bridge 6D sends a reset response to the owner 1, which is an initiator in the step ST605 shown in FIG. 14.

In the step ST406 shown in FIG. 13, the owner 1 received the reset response verifies that the setting of isochronous transaction is released. The process is terminated completely.

Operation for releasing the setting of isochronous transaction in the example of arrangement shown in FIG. 4A will be described below.

First, the owner 1 starts operation for releasing the setting of isochronous transaction according to the flowchart shown in FIG. 13. In this case, as the owner 1 and the talker 2 respectively exist on the different buses 4A and 4C, the process proceeds to the step ST402 according to the judgment in the step ST401. In the step ST402, the owner 1 requests the portal 60A, as a target node, of the bridge 6D on a path toward the local bus 4C on which the talker 2 exists, to release the setting of isochronous transaction thereof.

The portal 60A of the bridge 6D received the request for releasing the setting of isochronous transaction of the bridge 6D starts operation for releasing the setting of isochronous transaction according to the flowchart shown in FIG. 14. In this case, since the portal 60A of the bridge 6D does not exist on a path from the talker 2 to the listener 3 and the portal is not set, OIP [cid] is 0. Therefore, the process proceeds to the step ST603 according to the judgment in the step ST601. In the step ST603, the portal 60A of the bridge 6D requests the other portal 60B of the bridge 6D to release the setting of isochronous transaction thereof.

The portal 60B of the bridge 6D received the request for releasing the setting of isochronous transaction starts operation for releasing the setting of isochronous transaction according to the flowchart shown in FIG. 15. In this case, as OIP [cid] is 0 and the talker 2 does not exist on the local bus 4B, TOIP [cid] is 0. Therefore, the process proceeds to the step ST503 according to the judgment in the step ST501. In the step ST503, the portal 60B of the bridge 6D requests the portal 60A, as a target node, of the bridge 6E on a path to the local bus 4C on which the talker 2 exists, to release the setting of isochronous transaction (c1) thereof.

The portal 60A of the bridge 6E received the request (c1) for releasing the setting of isochronous transaction starts operation for releasing the setting of isochronous transaction according to the flowchart shown in FIG. 14. In this case, as OIP [cid] is 0, the process proceeds to the step ST603 according to the judgment in the step ST601. In the step ST603, the portal 60A of the bridge 6E requests the other portal 60B of the bridge 6E to release the setting of isochronous transaction thereof (c2).

The portal 60B of the bridge 6E received the request (c2) for releasing the setting of isochronous transaction starts operation for releasing the setting of isochronous transaction according to the flowchart shown in FIG. 15. In this case, since the talker 2 exists on the local bus 4C and the isochronous transaction for the local bus 4C is set, TOIP [cid] is 1. Therefore, the process proceeds to the step ST506 according to the judgment in the step ST501. In the step ST506, the setting of isochronous transaction for the local bus 4C is released.

Also, as OIP [cid] is 0, the process proceeds to the step ST509 according to the judgment in the step ST507.

Also, as the listener 3 does not exist on the local bus 4C, the process proceeds to the step ST503 according to the judgment in the step ST509. In the step ST503, the portal 60B of the bridge 6E requests the portal 60B itself of the bridge 6E on a path toward the local bus 4B on which the listener 3 exists, to release the setting of isochronous transaction thereof (d1).

The portal 60B of the bridge 6E received the request (d1) for releasing the setting of isochronous transaction starts operation of releasing the setting of isochronous transaction according to the flowchart shown in FIG. 14. In this case, since the portal 60B of the bridge 6E exists on a path from the talker 2 to the listener 3 and the portal 60 B of the bridge 6E is set, OIP [cid] is 1. Therefore, the process proceeds to the step ST602 according to the judgment in the step ST601. In the step ST602, the setting of the portal 60B of the bridge 6E is released.

Further, in the step ST603, the portal 60B of the bridge 6E requests the other portal 60A of the bridge 6E to release the setting of isochronous transaction thereof (d2).

The portal 60A of the bridge 6E received the request (d2) for releasing the setting of isochronous transaction of the bridge 6E starts operation for releasing the setting of isochronous transaction according to the flowchart shown in FIG. 15. In this case, as the isochronous transaction for the local bus 4B is set, TOIP [cid] is 1. Therefore, the process proceeds to the step ST506 according to the judgment in the step ST501. In the step ST506, the setting of isochronous transaction for the local bus 4B is released.

Also, since the portal 60A of the bridge 6E exists on a path from the talker 2 to the listener 3 and the portal 60A of the bridge 6E is set, OIP [cid] is 1. Therefore, the process proceeds to the step ST508 according to the judgment in the step ST507. In the step ST508, the setting for the portal 60A of the bridge 6E is released.

As the listener 3 exists on the local bus 4B, the process proceeds to the step ST505 according to the judgment in the step ST509. In the step ST505, the portal 60A of the bridge 6E sends a reset response to the other portal 60B of the bridge 6E. The process related to the request (d2) is terminated.

Next, in the step ST605 shown in FIG. 14, the portal 60B of the bridge 6E received the reset response of the bridge 6E sends a reset response to the portal 60B of the bridge 6E itself, which is an initiator. The process related to the request (d1) is terminated.

In the step ST505 shown in FIG. 15, the portal 60B of the bridge 6E received the reset response sends a reset response to the other portal 60A of the bridge 6E. The process related to the request (c2) is terminated.

In the step ST605 shown in FIG. 11, the portal 60A of the bridge 6E received the reset response sends a reset response to the portal 60B of the bridge 6D, which is an initiator. The process related to the request (c1) is terminated.

In the step ST505 shown in FIG. 15, the portal 60B of the bridge 6D received the reset response sends a reset response to the other portal 60A of the bridge 6D.

In the step ST605 shown in FIG. 14, the portal 60A of the bridge 6D received the reset response sends a reset response to the owner 1, which is an initiator.

In the step ST406 shown in FIG. 13, the owner 1 received the reset response verifies that the setting of isochronous transaction is released. The process is terminated completely.

Operation for releasing the setting of isochronous transaction in the example of arrangement shown in FIG. 4B will be described below.

First, the owner 1 starts operation for releasing the setting of isochronous transaction according to the flowchart shown in FIG. 13. In this case, as the owner 1 and the talker 2 respectively exist on the different buses 4B and 4A, the process proceeds to the step ST402 according to the judgment in the step ST401. In the step ST402, the owner 1 requests the portal 60B, as a target node, of the bridge 6D on a path toward the local bus 4A on which the talker 2 exists, to release the setting of isochronous transaction thereof (c1).

The portal 60B of the bridge 6D received the request (c1) for releasing the setting of isochronous transaction starts operation for releasing the setting of isochronous transaction according to the flowchart shown in FIG. 14. In this case, as OIP [cid] is 0, the process proceeds to the step ST603 according to the judgment in the step ST601. In the step ST603, the portal 60B of the bridge 6D requests the other portal 60A of the bridge 6D to release the setting of isochronous transaction thereof (c2).

The portal 60A of the bridge 6D received the request (c2) for releasing the setting of isochronous transaction starts operation for releasing the setting of isochronous transaction according to the flowchart shown in FIG. 15. In this case, since the talker 2 exists on the local bus 4A and the isochronous transaction for the local bus 4A is set, TOIP [cid] is 1. Therefore, the process proceeds to the step ST506 according to the judgement in the step ST501. In the step ST506, the setting of isochronous transaction for the local bus 4A is released.

Also, as OIP [cid] is 0, the process proceeds to the step ST509 according to the judgment in the step ST507.

Also, as the listener 3 does not exist on the local bus 4A, the process proceeds to the step ST503 according to the judgment in the step ST509. In the step ST503, the portal 60A of the bridge 6D requests the portal 60A itself of the bridge 6D on a path toward the local bus 4C on which the listener 3 exists, to release the setting of isochronous transaction thereof (d1).

The portal 60A of the bridge 6D received the request (d1) for releasing the setting of isochronous transaction starts operation for releasing the setting of isochronous transaction according to the flowchart shown in FIG. 14. In this case, since the portal 60A of the bridge 6D exists on a path from the talker 2 to the listener 3 and the portal 60A of the bridge 6D is set, OIP [cid] is 1. Therefore, the process proceeds to the step ST602 according to the judgment in the step ST601. In the step ST602, the setting for the portal 60A of the bridge 6D is released.

In the step ST603, the portal 60A of the bridge 6D requests the other portal 60B of the bridge 6D to release the setting of isochronous transaction thereof (d2).

The portal 60B of the bridge 6D received the request (d2) for releasing the setting of isochronous transaction starts operation for releasing the setting of isochronous transaction according to the flowchart shown in FIG. 15. In this case, as the setting of isochronous transaction for the local bus 4B is made, TOIP [cid] is 1. Therefore, the process proceeds to the step ST506 according to the judgment in the step ST501. In the step ST506, the setting of isochronous transaction for the local bus 4B is released.

Also, the portal 60B of the bridge 6D exists on a path from the talker 2 to the listener 3 and the portal 60B is set, OIP [cid] is 1. Therefore, the process proceeds to the step ST508 according to the judgment in the step ST507. In the step ST508, the setting for the portal 60B of the bridge 6D is released.

Also, as the listener 3 does not exist on the local bus 4B, the process proceeds to the step ST503 according to the judgment in the step ST509. In the step ST503, the portal 60B of the bridge 6D requests the portal 60A, as a target node, of the bridge 6E on a path toward the local bus 4C on which the listener 3 exists, to release the setting of isochronous transaction thereof.

The portal 60A of the bridge 6E received the request for releasing the setting of isochronous transaction starts operation for releasing the setting of isochronous transaction according to the flowchart shown in FIG. 14. In this case, the portal 60A of the bridge 6E exists on a path from the talker 2 to the listener 3 and the portal 60 A is set, OIP [cid] is 1. Therefore, the process proceeds to the step ST602 according to the judgment in the step ST601. In the step ST602, the setting for the portal 60A of the bridge 6E is released. Further, in the step ST603, the portal 60A of the bridge 6E requests the other portal 60B of the bridge 6E to release the setting of isochronous transaction thereof.

The portal 60B of the bridge 6E received the request for releasing the setting of isochronous transaction starts operation for releasing the setting of isochronous transaction according to the flowchart shown in FIG. 15. In this case, as the setting of isochronous transaction for the local bus 4C is made, TOIP [cid] is 1. Therefore, the process proceeds to the step ST506 according to the judgment in the step ST501. In the step ST506, the setting of isochronous transaction for the local bus 4C is released.

Also, since the portal 60B of the bridge 6E exists on a path from the talker 2 to the listener 3 and the portal 60B of the bridge 6E is set, OIP [cid] is 1. Therefore, the process proceeds to the step ST508 according to the judgment in the step ST507. In the step ST508, the setting for the portal 60B is released.

Also, as the listener 3 exists on the local bus 4C, the process proceeds to the step ST505 according to the judgment in the step ST509. In the step ST505, the portal 60B of the bridge 6E sends a reset response to the other portal 60A of the bridge 6E.

In the step ST605 shown in FIG. 14, the portal 60A of the bridge 6E received the reset response sends a reset response to the portal 60B of the bridge 6D, which is an initiator.

In the step ST505 shown in FIG. 15, the portal 60B of the bridge 6D received the reset response sends a reset response to the other portal 60A of the bridge 6D. The process related to the request (d2) is terminated.

In the step ST605 shown in FIG. 14, the portal 60A of the bridge 6D received the reset response sends a reset response to the portal 60A of the bridge 6D itself, which is an initiator. The process related to the request (d1) is terminated.

In the step ST505 shown in FIG. 15, the portal 60A of the bridge 6D received the reset response sends a reset response to the other portal 60B of the bridge 6D. The process related to the request (c2) is terminated.

In the step ST605 shown in FIG. 14, the portal 60B of the bridge 6D received the reset response sends a reset response to the owner 1, which is an initiator. The process related to the request (c1) is terminated.

The owner 1 received the reset response verifies in the step ST406 shown in FIG. 13 that the setting of isochronous transaction is released. The process is terminated completely.

As described above, in this embodiment, the owner 1 operates according to the flowchart shown in FIG. 13 and the portals 60A and 60B constituting the bridge 6 suitably operate according to the flowchart shown in FIG. 14 or 15. Therefore, a request for releasing the setting of isochronous transaction is sequentially propagated on a path from the talker 2 to the listener 3 and the setting of isochronous transaction for the buses and the bridges on the path from the talker 2 to the listener 3 is released. Hereby, even if the owner 1, the talker 2 and the listener 3 do not exist on the same bus, the setting of isochronous transaction is satisfactorily released.

In the above embodiment, although a request for releasing the setting of isochronous transaction is sequentially propagated on a path from the talker 2 to the listener 3, conversely a request for releasing the setting of isochronous transaction may be also sequentially propagated on a path from the listener 3 to the talker 2. Only the substitution of the talker and the listener for each other in the flowcharts shown in FIGS. 13 to 15 allows the bus network to realize the above.

Also, when the talker 2 is located on the side of the owner 1, a path from the talker 2 to the listener 3 may be also selected. When the listener 3 is located on the side of the owner 1, a path from the listener 3 to the talker 2 may be also selected.

Computer program data for realizing the above processes in each flowchart shown in FIGS. 10 to 15 can be provided by a disk record medium such as an optical disk and a magnetic disk, and a tape record medium. The above computer program data can be also provided via a telecommunication line and in each node, the above program data can be installed or downloaded.

Also, in the above embodiment, the present invention is applied to the IEEE-1394 bus network. However, it is needless to say that the present invention can be also similarly applied to another bus network in which plural buses are connected via a bridge.

According to the present invention, a request for releasing the setting of isochronous transaction from a resource-possessing node is sequentially propagated to release the setting of isochronous transaction for buses and bridges respectively constituting a path (a channel) from a sending node to a receiving node. When the resource-possessing node, the sending node and the receiving node do not exist on the same bus, the setting of isochronous transaction can be satisfactorily made.

As many apparently widely different embodiments of this invention may be made without departing from the spirit and scope thereof, it is to be understood that the invention is not limited to the specific embodiments thereof except as defined in the appended claims.

What is claimed is:

1. A method for releasing setting of an isochronous transaction in a bus network in which a plurality of buses are connected via a bridge including first communication means and second communication means, comprising:

a first step of releasing setting of said isochronous transaction for a first bus by a resource-possessing node when a sending node or a receiving node exists on said first bus on which said resource-possessing node exists, and sending a request for releasing the setting of isochronous transaction by said resource-possessing node to said first communication means of said bridge existing on said first bus when no sending node or no receiving node exists on said first bus, said first communication means of said bridge on said first bus passing a packet to said sending node or said receiving node not existing on said first bus;

a second step of sending a request for releasing the setting of said isochronous transaction to said second communication means connected to said first communication means by said first communication means which receives said request for releasing the setting of said isochronous transaction from said resource-possessing node and releasing the setting of said isochronous transaction for said first communication means when said first communication means exists on a path from said sending node to said receiving node; and a third step of releasing the setting of said isochronous transaction for a second bus, when said sending node or said receiving node exists on said second bus on which said second communication means exists, by said second communication means which receives said request for releasing the setting of said isochronous transaction, releasing the setting of said isochronous transaction for said second communication means when said second communication means exists on a path from said sending node to said receiving node and further, sending a request for releasing the setting of said isochronous transaction to said first communication means of said bridge existing on said second bus when no sending node or no receiving node exists on said second bus, wherein said first communication means of said bridge on said second bus passes a packet to said sending node or said receiving node not existing on said second bus.

2. The method for releasing setting of an isochronous transaction in a bus network according to claim 1, further comprising:

a step of sending a response that a release from the setting of said isochronous transaction is complete by said first communication means of said bridge to said resource-possessing node or said second communication means of said bridge, each of said resource-possessing node and the second communication means sending a request for releasing the setting of said isochronous transaction to said second communication means connected to said first communication means; and a step of sending a response that the release from the setting of said isochronous transaction is complete by said communication means to said first communication means connected to said second communication means when said first communication means of said bridge after said second communication means sends a request for releasing the setting of said isochronous transaction to said first communication means of said bridge.

3. The method for releasing setting of an isochronous transaction in a bus network according to claim 1 further comprising the steps of:

using an IEEE-1394 bus as said bus, wherein said first and second communication means are respectively portals.

4. A bus network in which a plurality of buses are connected via a bridge including first communication means and second communication means, wherein a resource-possessing node, a sending node, and a receiving node are connected to the same bus or different buses of said plurality of buses;

said resource-possessing node comprising, means for releasing the setting of said isochronous transaction for said first bus when said sending node or said receiving node exists on said first bus on which said resource-possessing node exists, and means for sending a request for releasing the setting of said isochronous transaction, when no sending node or no receiving node exists on said first bus, to said first communication means of said bridge existing on said first bus and passing a packet to said sending node or said receiving node not existing on the first bus;

said first communication means of said bridge comprising, means for sending a request for releasing the setting of said isochronous transaction to said second communication means connected to said first communication means when said first communication means receives a request for releasing the setting of said from said resource-possessing node, and means for releasing the setting of said isochronous transaction for said first communication means if said first communication means exists on a path from said sending node to said receiving node when said first communication means receives said request for releasing the setting of said isochronous transaction from said resource-possessing node; and said second communication means of said bridge comprising, means for releasing the setting of said isochronous transaction for said second bus if said sending node or said receiving node exists on said second bus on which said second communication mean exists when said second communication means receives a request for releasing the setting of said isochronous transaction from said first communication means, means for releasing the setting of said isochronous transaction for said second communication means if said second communication means exists on a path from said sending node to said receiving node when said second communication means receives said request for releasing the setting of said isochronous transaction from said first communication means, and means for sending a request for releasing the setting of said isochronous transaction to said first communication means of said bridge if no sending node or no receiving node exists on said second bus, said first communication means existing on said second bus and passing a packet to said sending node or said receiving node not existing on the second bus, when said second communication means receives said request for setting said isochronous transaction from said first communication means.

5. The bus network according to claim 4, wherein said first communication means of said bridge comprises:

means for sending a response that the release from the setting of said isochronous transaction is complete to said resource-possessing node or said second communication means of said bridge, each of said resource-possessing node and said second communication means sending a request for releasing the setting of said isochronous transaction to said first communication means, when said first communication means receives said response from said second communication means after said first communication means sends a request for releasing the setting of said isochronous transaction to said second communication means connected to said first communication means; and wherein said second communication means of said bridge comprises;

means for sending a response that the release from the setting of said isochronous transaction is complete to said first communication means connected to said second communication means when said second communication means receives said response from said first communication means of said bridge after said second communication means sends a request for releasing the setting of said isochronous transaction to said first communication means of said bridge.

6. The bus network according to claim 4, wherein an IEEE-1394 bus is used as said bus and said first and second communication means are respectively portals.

7. An information provision medium for providing a computer program used in a bus network in which a plurality of buses are connected via a bridge including first communication means and second communication means for executing at least one of the following:

a step in which a resource-possessing node releases setting of the isochronous transaction for a first bus when a sending node or a receiving node exists on a first bus of the plurality of buses on which the resource-possessing node exists and sends a request for releasing the setting of the isochronous transaction to the first communication means of the bridge existing on the first bus when no sending node or no receiving node exists of the first bus, wherein the first communication means passes a packet to the sending node or the receiving node not existing on the first bus;

a step in which the first communication means of the bridge, which receives the request for setting the isochronous transaction from the resource-possessing node, sends a request for releasing the setting of the synchronous communication to the second communication means connected to the first communication means and releases setting of the isochronous transaction for the first communication means when the first communication means exists on a path from the sending node to the receiving node; and a step in which the second communication means of the bridge, which receives the request for releasing the setting of the isochronous transaction, releases setting of the isochronous transaction for a second bus of the plurality of buses when the sending node or the receiving node exists on the second bus on which the second communication means exists, releases setting of the isochronous transaction for the second communication means when the second communication means exists on a path from the sending node to the receiving node, and sends a request for releasing the setting of the isochronous transaction to the first communication means of the bridge existing on the second bus when no sending node or no receiving node exists on the second bus, wherein said first communication means passes a packet to the sending node or the receiving node not existing on the second bus.

8. The information provision medium according to claim 7 for providing a computer program for executing at least one of the following:

a step in which the first communication means of bridge sends a response that a release from the setting of the isochronous transaction is complete to the resource-possessing node or the second communication means of the bridge, each of the resource-possessing node and the second communication means sending a request for releasing the setting of the isochronous transaction to the first communication means, when the first communication means receives a response from said second communication means after the first communication means sends a request for releasing the setting of the isochronous transaction to the second communication means connected to the first communication means; and a step in which the second communication means of the bridge sends a response that the release from the setting of the isochronous transaction is complete to the first communication means connected to the second communication means when the second communication means receives the response from the first communication means of the bridge after the second communication means sends a request for releasing the setting of the isochronous transaction to the first communication means of the bridge.

9. The information provision medium according to claim 7, wherein an IEEE-1394 bus is used as said bus and said first and second communication means are respectively portals.

* * * * *